(12) United States Patent
Scarfe et al.

(10) Patent No.: US 11,220,072 B2
(45) Date of Patent: Jan. 11, 2022

(54) MOLDING SYSTEM AND METHODS FOR FORMING STRUCTURES

(71) Applicant: The Boeing Company, Chicago, IL (US)

(72) Inventors: Manning Scarfe, Port Melbourne (AU); Peter J. Lockett, Port Melbourne (AU)

(73) Assignee: The Boeing Company, Chicago, IL (US)

( * ) Notice: Subject to any disclaimer, the term of this patent is extended or adjusted under 35 U.S.C. 154(b) by 4 days.

(21) Appl. No.: 16/732,742

(22) Filed: Jan. 2, 2020

(65) Prior Publication Data

US 2021/0206125 A1 Jul. 8, 2021

(51) Int. Cl.
*B29C 70/44* (2006.01)
*B29K 105/08* (2006.01)

(52) U.S. Cl.
CPC .... *B29C 70/443* (2013.01); *B29K 2105/0872* (2013.01)

(58) Field of Classification Search
CPC ......... B29C 53/04; B29C 70/28; B29C 70/44; B29C 70/446
See application file for complete search history.

(56) References Cited

U.S. PATENT DOCUMENTS

| 1,625,398 A | 4/1927 | Schaefer |
| 10,336,014 B2 | 7/2019 | Stawski |
| 2011/0037199 A1 | 2/2011 | Young |
| 2012/0076973 A1* | 3/2012 | Guzman ............ G06F 30/17 428/113 |
| 2014/0175709 A1 | 6/2014 | Blackburn et al. |
| 2015/0183171 A1 | 7/2015 | Kline et al. |
| 2016/0354982 A1 | 12/2016 | Prause et al. |
| 2017/0341317 A1* | 11/2017 | Roberts ............ B29C 70/44 |

FOREIGN PATENT DOCUMENTS

| EP | 3015258 A1 | 5/2016 |
| WO | WO2019049411 A1 | 3/2019 |

OTHER PUBLICATIONS

European Patent Office Extended Search Report, dated Apr. 30, 2021, regarding Application No. EP20207839.0, 9 pages.

* cited by examiner

*Primary Examiner* — Matthew J Daniels
*Assistant Examiner* — Yunju Kim
(74) *Attorney, Agent, or Firm* — Yee & Associates, P.C.

(57) ABSTRACT

A molding system and methods of forming a structure are presented. A molding system is configured to form a composite structure. The molding system comprises a first tool comprising a first vacuum groove, a first trough having a first edge configured to form a first bend of the composite structure, and a first molding surface; and a second tool comprising a second vacuum groove, a second trough having a second edge configured to form a second bend of the composite structure, and a second molding surface.

20 Claims, 16 Drawing Sheets

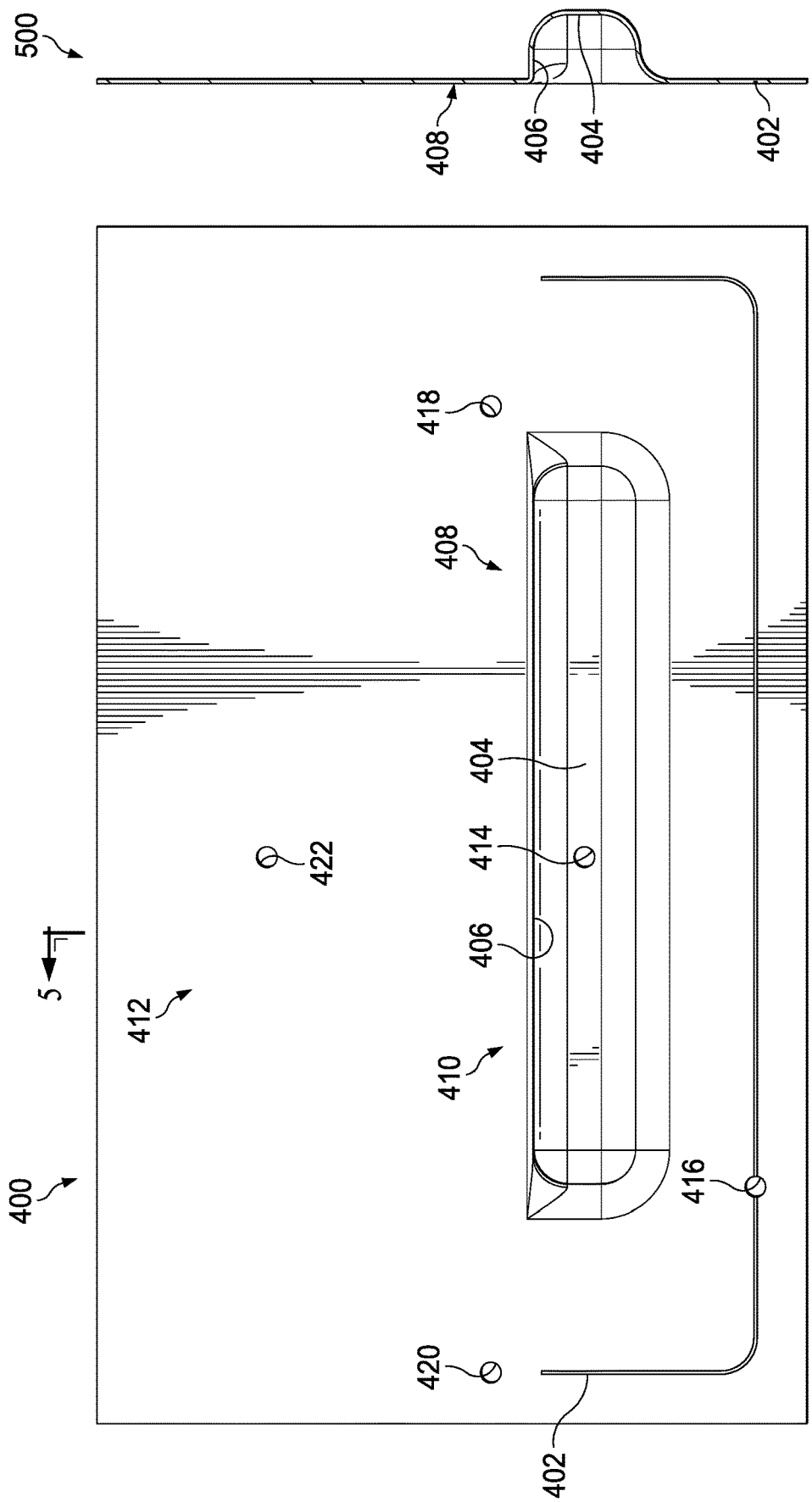

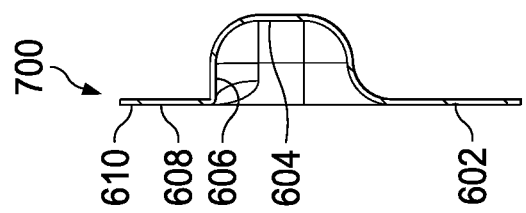
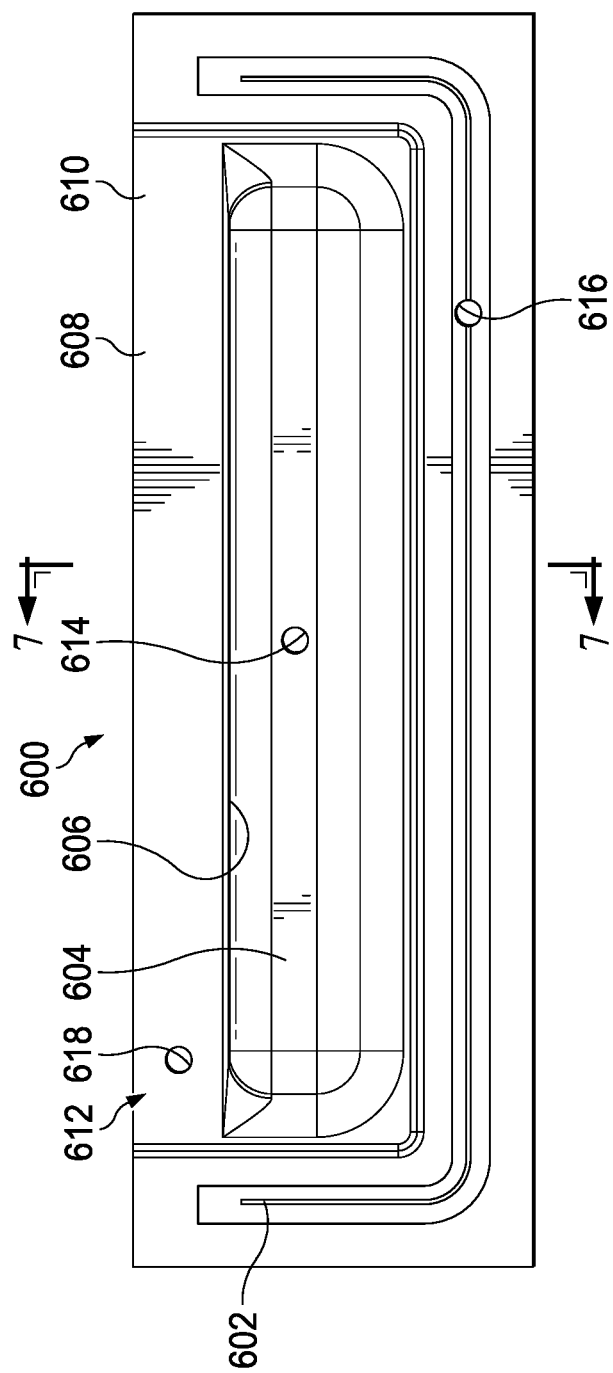

MOLDING SYSTEM AND METHODS FOR FORMING STRUCTURES

BACKGROUND INFORMATION

1. Field

The present disclosure relates generally to forming structures and more specifically to shaping a preform using a molding system.

2. Background

Some composite structures, such as composite stiffeners, have complex curvatures along their length. Additionally, some composite structures, such as composite stiffeners, have non-planar cross-sections. Composite stiffeners can have C-shaped, T-shaped, hat-shaped, or other desirably shaped cross-sections.

Z-shaped sections are conventionally formed using one of ply by ply hand layup or stamping using matched male and female tools. Ply by ply hand layup involves sweeping each ply into each radius. Ply by ply hand layup is undesirably labor intensive, involves considerable skill, and could be ergonomically undesirable. As a result, ply by ply hand layup has at least one of an undesirably long time or an undesirably high manufacturing cost.

Stamping using matched male and female tools is performed on an initial substantially flat layup. However, stamping is typically utilized with relatively simple geometries. Material bulk factor and manufacturing tolerances can cause inconsistencies when applying stamping to large or complex parts.

Therefore, it would be desirable to have a method and apparatus that takes into account at least some of the issues discussed above, as well as other possible issues.

SUMMARY

An embodiment of the present disclosure provides a molding system configured to form a composite structure. The molding system comprises a first tool comprising a first vacuum groove, a first trough having a first edge configured to form a first bend of the composite structure, and a first molding surface; and a second tool comprising a second vacuum groove, a second trough having a second edge configured to form a second bend of the composite structure, and a second molding surface.

Another embodiment of the present disclosure provides a method of forming a structure. A first bend of a cross-section of the structure is formed into a preform by pulling the preform over a first feature of a first tool by at least partially evacuating a first vacuum chamber between the first tool and the preform. A second bend of the cross-section of the structure is simultaneously formed into the preform by pulling the preform over a second feature of a second tool positioned above the first tool by at least partially evacuating a second vacuum chamber between the second tool and the preform.

Yet another embodiment of the present disclosure provides a method of forming a structure. A first bagging layer is sealed to a first tool. A second bagging layer is sealed to the first tool while a preform is between the first bagging layer and the second bagging layer. A second tool is sealed to the second bagging layer. A first vacuum chamber formed by the first bagging layer and the first tool is at least partially evacuated while at least partially evacuating a second vacuum chamber formed by the second bagging layer and the second tool to form the preform to a forming surface of the first tool and a forming surface of the second tool simultaneously.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 4 is an illustration of a top view of a first tool of a molding system in accordance with an illustrative embodiment;

FIG. 5 is an illustration of a cross-sectional view of a first tool of a molding system in accordance with an illustrative embodiment;

FIG. 6 is an illustration of a top view of a second tool of a molding system in accordance with an illustrative embodiment;

FIG. 7 is an illustration of a cross-sectional view of a second tool of a molding system in accordance with an illustrative embodiment;

DETAILED DESCRIPTION

The illustrative embodiments recognize and take into account one or more different considerations. The illustrative embodiments recognize and take into account that ply by ply hand layup relies on each ply remaining in position after being formed into any female bends. However, for a dry material system the material will not remain in the female bends. The illustrative embodiments recognize and take into account that ply by ply hand layup for pre-preg systems may have varied success depending on operator skill and material tack.

Stamping between male and female tools utilizes large forces and hard tooling to force the layup stack into the shape presented by the cavity between matched tools. As such, the structural fibers may be damaged or broken when being forced into a contour the fibers would not naturally drape into. Damage is especially likely if fibers have already formed around and/or onto particular features and are subsequently being forced into another feature while the cavity is reducing in size due to the tools closing together.

The illustrative embodiments recognize and take into account that vacuum forming may be used to pull a composite preform against a male mold. The illustrative embodiments recognize and take into account that existing vacuum forming methods for composite stiffeners are limited to C-sections due to inconsistencies with existing vacuum forming or hot drape forming of more complex parts, such as bridging, wrinkles, or radius thinning.

The illustrative embodiments recognize and take into account that double diaphragm forming may be used in forming C-shaped cross-sections. Double diaphragm forming utilizes simplified initial layup of flat (or single curvature) charges. Double diaphragm forming provides a forming technique that allows for greater control of or prevention of inconsistencies and reduction of manual operations which increase labor cost.

The illustrative embodiments recognize and take into account that applying known diaphragm forming methods to a Z-shaped cross-section would result in.

The illustrative examples provide a molding system and methods to implement advantages of diaphragm forming for more complex cross-sectional shapes. The illustrative examples provide advantages of a double diaphragm forming process for a more complex configuration than previously possible.

Figure 1:
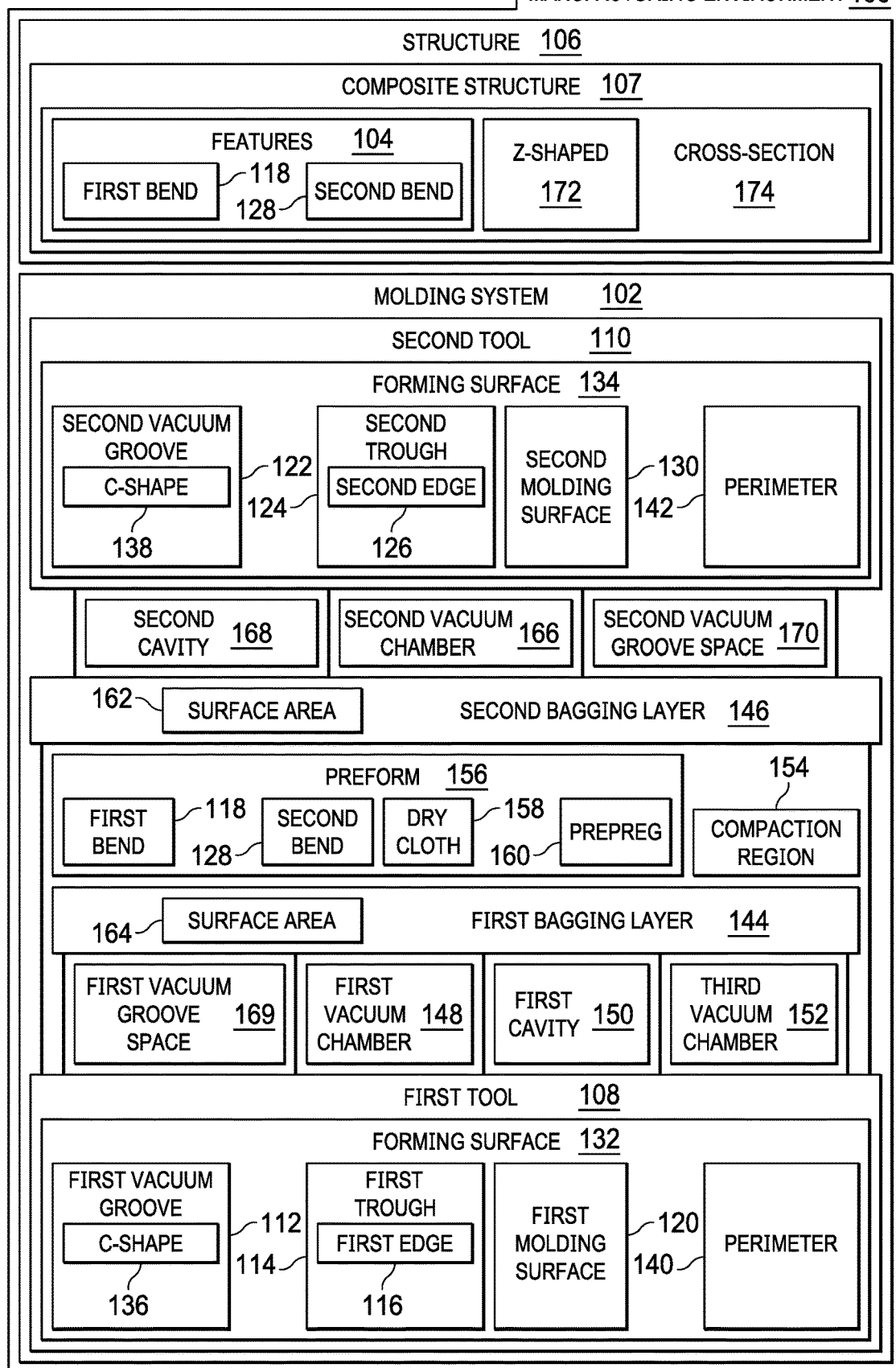
FIG. 1 is an illustration of a block diagram of a manufacturing environment in which an illustrative embodiment may be implemented.

Turning now to FIG. 1, an illustration of a block diagram of a manufacturing environment is depicted in which an illustrative embodiment may be implemented. Manufacturing environment 100 is an environment in which molding system 102 is used to form features 104 of structure 106. In some illustrative examples, structure 106 takes the form of composite structure 107.

Molding system 102 is configured to form composite structure 107. Molding system 102 comprises first tool 108 and second tool 110. First tool 108 comprises first vacuum groove 112, first trough 114 having first edge 116 configured to form first bend 118 of composite structure 107, and first molding surface 120. Second tool 110 comprises second vacuum groove 122, second trough 124 having second edge 126 configured to form second bend 128 of composite structure 107, and second molding surface 130.

First trough 114 and first molding surface 120 are portions of forming surface 132 of first tool 108. Second trough 124 and second molding surface 130 are portions of forming surface 134 of second tool 110.

First vacuum groove 112 is designed to secure a bagging layer so that the bagging layer does not slip into first trough 114. First vacuum groove 112 has any desirable shape. In some illustrative examples, first vacuum groove 112 has C-shape 136 that extends around a portion of first trough 114. By first vacuum groove 112 having C-shape 136, first vacuum groove 112 secures a bagging layer on three edges of first trough 114. In some illustrative examples, a sealing material is positioned in or around first vacuum groove 112 to seal a bagging layer to first vacuum groove 112.

Second vacuum groove 122 is designed to secure a bagging layer so that the bagging layer does not slip into second trough 124 during forming of a preform. Second vacuum groove 122 has any desirable shape. In some illustrative examples, second vacuum groove 122 has C-shape 138 that extends around a portion of second trough 124.

In some illustrative examples, first tool 108 has a larger footprint than second tool 110. In these illustrative examples, perimeter 140 of first tool 108 is larger than perimeter 142 of second tool 110.

First bagging layer 144 and second bagging layer 146 are also present in molding system 102. First bagging layer 144 is sealed to first tool 108 between first vacuum groove 112 and first trough 114 such that first bagging layer 144 extends over first trough 114.

Second bagging layer 146 is sealed to first tool 108 such that the second bagging layer 146 extends over first vacuum groove 112 and first trough 114. First bagging layer 144 and second bagging layer 146 are sealed to first tool 108 using any desirable sealing material. The sealing material takes the form of an adhesive transfer tape, mastic, sealant, or any other desirable type of sealing material.

Sealing first bagging layer 144 to first tool 108 forms first vacuum chamber 148, first cavity 150, and third vacuum chamber 152. First vacuum chamber 148 is formed between first trough 114 and first bagging layer 144. Sealing material (not depicted) extends around first trough 114 to seal first bagging layer 144 to first tool 108. In some illustrative example, two different types of sealing material are used in conjunction to form first vacuum chamber 148.

First cavity 150 is formed over first molding surface 120. Sealing material (not depicted) extends around first molding surface 120 to seal first bagging layer 144 to first tool 108.

Third vacuum chamber 152 is formed over a remainder of forming surface 132. Sealing material (not depicted) extends around a portion of forming surface 132 to seal first bagging layer 144 to first tool 108.

In some illustrative examples, sealing material follows the perimeter of first bagging layer 144. In some illustrative examples, sealing material following the perimeter of first bagging layer 144 forms portions of first vacuum chamber 148, first cavity 150, and third vacuum chamber 152.

Second bagging layer 146 is sealed to first tool 108. When second bagging layer 146 is sealed to first tool 108, first bagging layer 144, and second bagging layer 146 form compaction region 154. Preform 156 to be formed into structure 106 is present in compaction region 154.

Preform 156 is a flexible material configured to be formed in a mold. In some illustrative examples, preform 156 takes the form of a composite material or a composite precursor. In some illustrative examples, preform 156 is dry cloth 158. When preform 156 is dry cloth 158, dry cloth 158 will be infused with resin after forming. In some illustrative examples, preform 156 is prepreg 160. In some illustrative examples when preform 156 is prepreg 160, prepreg 160 is heated prior to forming preform 156 to forming surface 132 of first tool 108.

Second bagging layer 146 is sealed over preform 156 and first bagging layer 144. In some illustrative examples, sealing material follows the perimeter of second bagging layer 146. In some illustrative examples, sealing material following the perimeter of second bagging layer 146 forms compaction region 154.

Second bagging layer 146 has a larger footprint than first bagging layer 144. Surface area 162 of second bagging layer 146 is greater than surface area 164 of first bagging layer 144.

Second tool 110 is sealed to second bagging layer 146 over first molding surface 120 of first tool 108. Second tool 110 is sealed to second bagging layer 146 such that second trough 124 faces first molding surface 120.

When second tool 110 is sealed to second bagging layer 146, second bagging layer 146 and second tool 110 form second vacuum chamber 166, second cavity 168, and second vacuum groove space 170.

In this illustrative example, first tool 108 and second tool 110 are configured to form structure 106 having Z-shaped 172 cross-section 174. Z-shaped 172 cross-section 174 includes first bend 118 formed by first tool 108 as well as second bend 128 formed by second tool 110. First bend 118 connects an arm of Z-shaped 172 cross-section 174 to a web of Z-shaped 172 cross-section 174. Second bend 128 connects a second arm of Z-shaped 172 cross-section 174 to the web of Z-shaped 172 cross-section 174.

First tool 108 and second tool 110 are configured to form first bend 118 and second bend 128 substantially simultaneously. Preform 156 will be formed over first edge 116 and second edge 126 substantially simultaneously.

After sealing second tool 110 to second bagging layer 146, pressures in each of first vacuum chamber 148, first cavity 150, third vacuum chamber 152, compaction region 154, second cavity 168, second vacuum chamber 166, and second vacuum groove space 170 are controlled. The pressures in each area of molding system 102 are controlled to form cross-section 174 of composite structure 107.

First, a vacuum is simultaneously drawn in first cavity 150 formed by the first bagging layer sealed to first tool 108 and second cavity 168 formed by second bagging layer 146 sealed to second tool 110. The vacuum is provided through ports (not depicted) of first tool 108 and second tool 110. The ports are provided at any desirable location of first tool 108 and second tool 110.

Simultaneously drawing the vacuum in first cavity 150 and second cavity 168 clamps first bagging layer 144 to first tool 108 and second bagging layer 146 to second tool 110. Simultaneously drawing a vacuum in first cavity 150 and second cavity 168 is performed prior to at least partially evacuating first vacuum chamber 148 and second vacuum chamber 166.

A vacuum is drawn in first vacuum groove 112 of first tool 108 to clamp second bagging layer 146 to first tool 108. Clamping second bagging layer 146 to first tool 108 restricts pulling of second bagging layer 146 and first bagging layer 144 into first trough 114 of first tool 108.

In some illustrative examples, a sealing material is associated with first vacuum groove 112. In these illustrative examples, drawing a vacuum in first vacuum groove 112 pulls a vacuum in first vacuum groove space 169 formed by second bagging layer 146, first vacuum groove 112, and a sealing material.

A vacuum is drawn in second vacuum groove 122 of second tool 110 to clamp second bagging layer 146 to second tool 110. Clamping second bagging layer 146 to second tool 110 restricts pulling of second bagging layer 146 into second trough 124 during forming of preform 156. Drawing a vacuum in second vacuum groove 122 pulls a vacuum in second vacuum groove space 170 formed by second bagging layer 146, second vacuum groove 122, and a sealing material.

After drawing a vacuum in second vacuum groove 122, a cavity between first bagging layer 144 and second bagging layer 146 is at least partially evacuated to clamp first tool 108 and second tool 110 together and compact a portion of preform 156. In these illustrative examples, the cavity is compaction region 154. By at least partially evacuating compaction region 154, first tool 108 and second tool 110 are clamped together and a portion of preform 156 between first molding surface 120 and second molding surface 130 is compacted. Compacting preform 156 between first molding surface 120 and second molding surface 130 will form a "web" of a Z-shaped 172 cross-section 174.

Preform 156 is formed to forming surface 132 of first tool 108 and forming surface 134 of second tool 110 simultaneously by at least partially evacuating first vacuum chamber 148 formed by first bagging layer 144 and first tool 108 while at least partially evacuating second vacuum chamber 166 formed by second bagging layer 146 and second tool 110. By at least partially evacuating first vacuum chamber 148, preform 156 is pulled over first edge 116 to form first bend 118. By at least partially evacuating second vacuum chamber 166, preform 156 is pulled over second edge 126 to form second bend 128. In some illustrative examples, preform 156 is heated to set cross-section 174 after simultaneously forming preform 156 to forming surface 132 of first tool 108 and forming surface 134 of second tool 110.

The illustration of manufacturing environment 100 in FIG. 1 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, although sealing materials are not depicted, sealing materials are present to seal first bagging layer 144 to first tool 108, second bagging layer 146 to first tool 108, and second tool 110 to second bagging layer 146. As another example, any desirable types and quantities of processing layers are present. In one illustrative example, a number of breather layers is present in molding system 102. In one illustrative example, a breather layer is present between first molding surface 120 and first bagging layer 144. In another illustrative example, a breather layer is present between first bagging layer 144 and preform 156.

Figure 2:
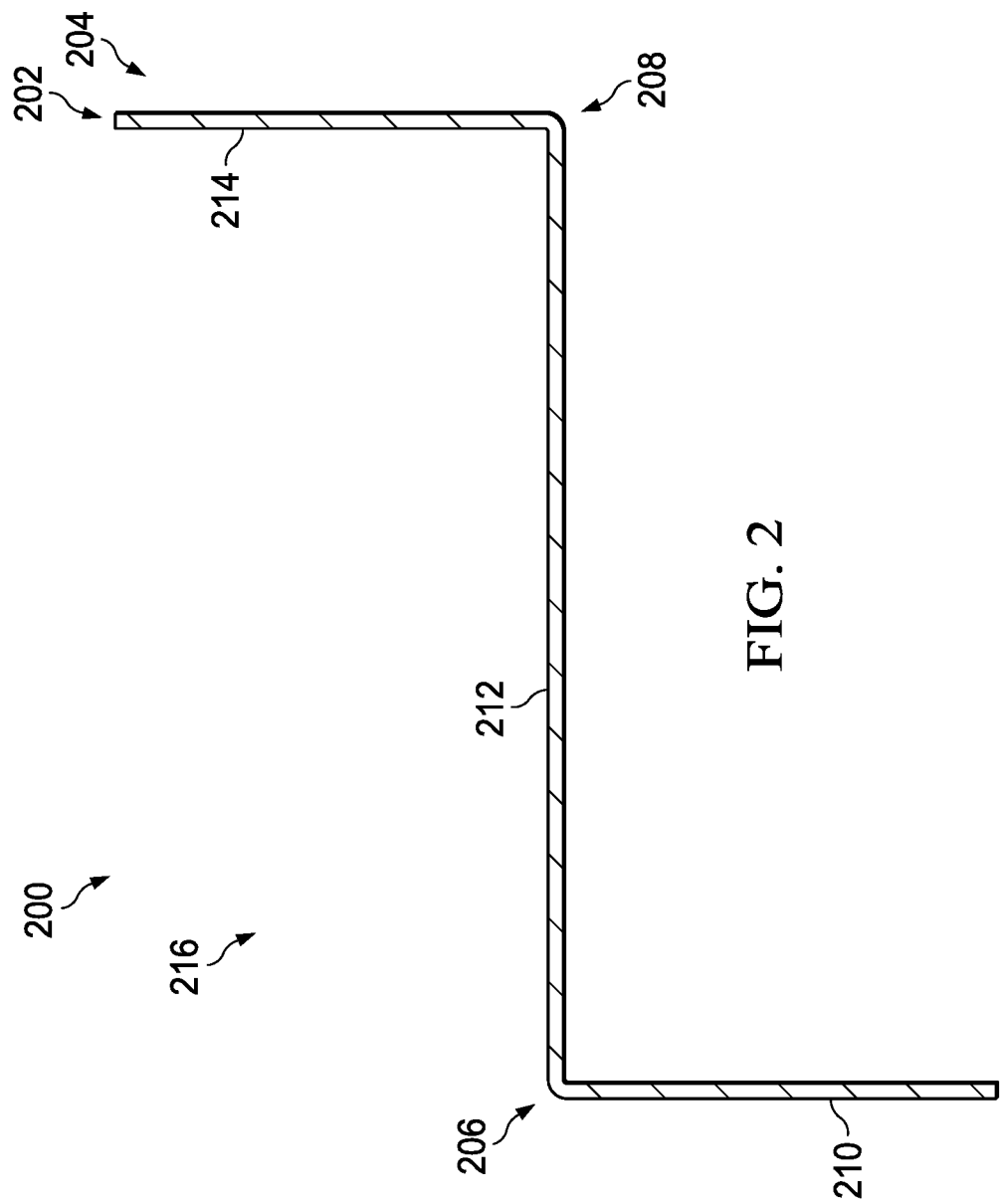
FIG. 2 is an illustration of a cross-sectional view of a composite structure in accordance with an illustrative embodiment.

Turning now to FIG. 2, an illustration of a cross-sectional view of a composite structure is depicted in accordance with an illustrative embodiment. Composite structure 200 is a physical implementation of composite structure 107 of FIG. 1. Composite structure 200 may also be referred to as a stiffener or a stringer. Composite structure 200 has cross-section 202 that is Z-shaped 204. Composite structure 200 has first bend 206 and second bend 208. First bend 206 is positioned between arm 210 and web 212. Second bend 208 is positioned between arm 214 and web 212.

Although view 216 only shows cross-section 202, additional three-dimensional shape is present in composite structure 200. For example, composite structure 200 may also have curvature, twists, or other three-dimensional complex shapes as composite structure 200 moves into or out of the page. The curvature, twists, or other three-dimensional complex shapes are independent of cross-section 202. Additional three-dimensional shape as composite structure 200 moves into and out of the page is related to surrounding structures. For example, when composite structure 200 will be joined to a surrounding structure, the curvature of the surrounding structure influences the curvature of composite structure 200 such that composite structure 200 will follow the curvature of the surrounding structure.

Figure 3:
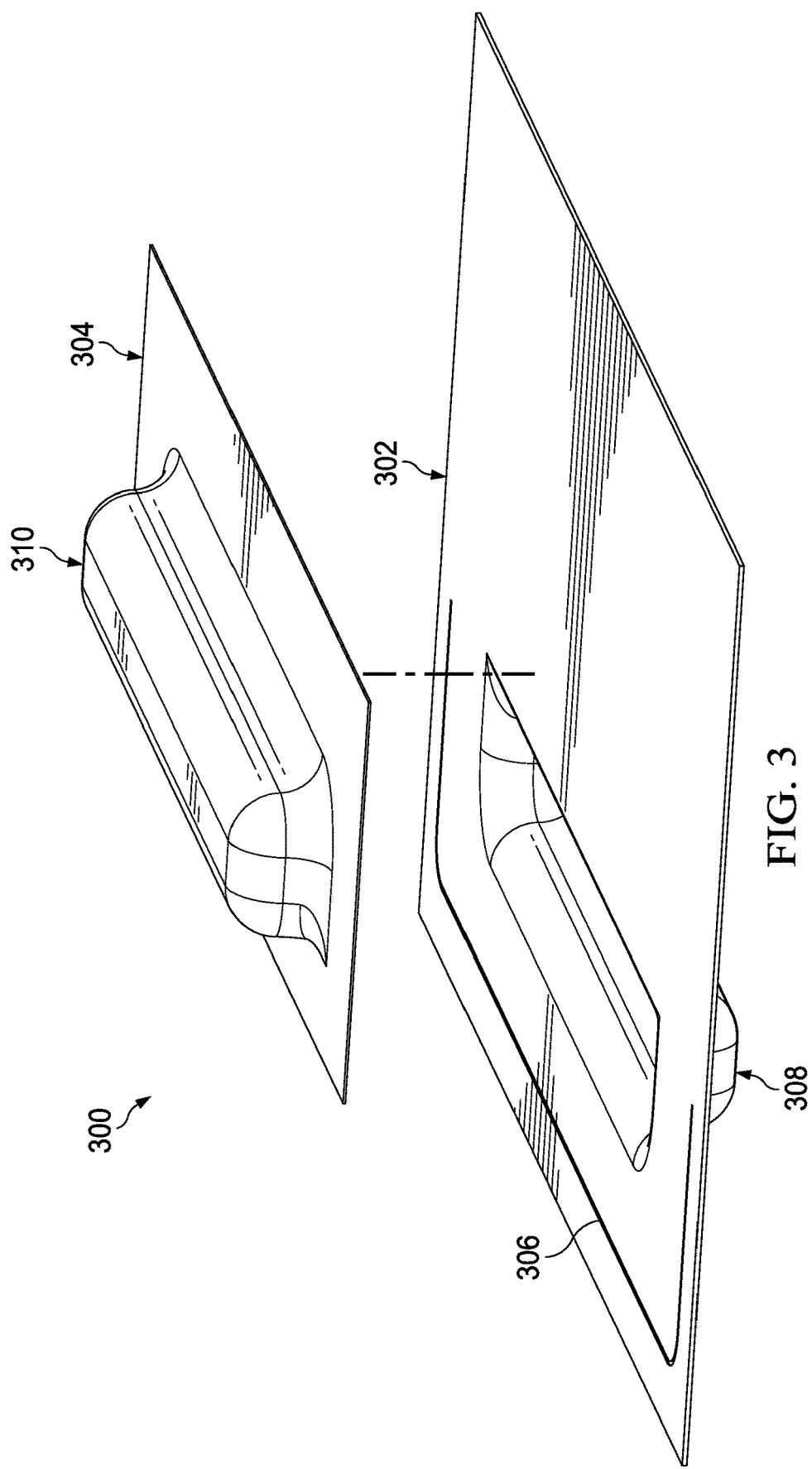
FIG. 3 is an illustration of an isometric view of a molding system in accordance with an illustrative embodiment.
Figure 8:
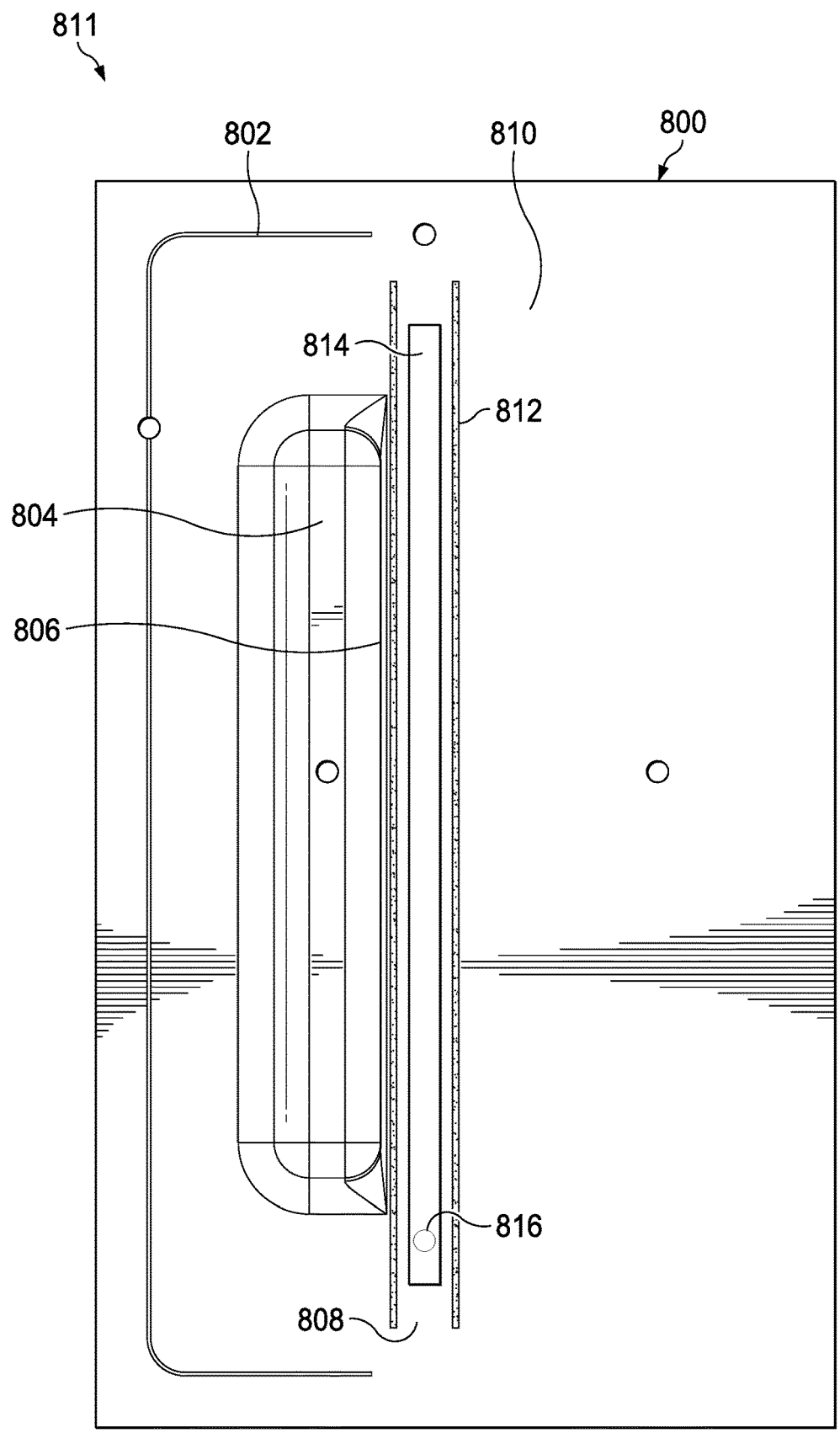
FIG. 8 is an illustration of a top view of a first tool of a molding system with sealing material in accordance with an illustrative embodiment.

Turning now to FIG. 3, an illustration of an isometric view of a molding system is depicted in accordance with an illustrative embodiment. Molding system 300 is a physical implementation of molding system 102 of FIG. 1. Molding system 300 may be used to form composite structure 200.

Molding system 300 is configured to form a composite structure. Molding system 300 comprises first tool 302 and second tool 304. First tool 302 comprises first vacuum groove 306, first trough 308 having a first edge (not visible) configured to form a first bend of the composite structure, and a first molding surface (not visible). Second tool 304 comprises a second vacuum groove (not visible), second trough 310 having a second edge (not visible) configured to form a second bend of the composite structure, and a second molding surface (not visible). As depicted, first vacuum groove 306 has C-shape 312 that extends around a portion of first trough 308.

To form a composite structure, molding system 300 will also include vacuum forming materials such as bagging layers, sealing materials, breathers, or other vacuum forming materials. The vacuum forming materials will be positioned between first tool 302 and second tool 304 during forming of the composite structure.

Turning now to FIG. 4, an illustration of a top view of a first tool of a molding system is depicted in accordance with an illustrative embodiment. First tool 400 is a physical implementation of first tool 108 of FIG. 1. In some illustrative examples, first tool 400 is used to form composite structure 200 of FIG. 2. In some illustrative examples, first tool 400 may be the same as first tool 302 of FIG. 3.

First tool 400 comprises first vacuum groove 402, first trough 404 having first edge 406 configured to form a first bend of a composite structure, and first molding surface 408. Forming surface 410 includes first trough 404 and first molding surface 408 configured to form features into a composite structure.

First tool 400 has plurality of ports 412 configured to be connected to a vacuum source. Plurality of ports 412 includes port 414, port 416, port 418, port 420, and port 422.

Port 414 is present in first trough 404. Port 414 is configured to evacuate a first vacuum chamber formed by first trough 404 to form a preform to first edge 406. Port 416 is present in first vacuum groove 402. Port 416 is configured to seal a vacuum bagging layer to first tool 400. Port 416 restrains the vacuum bagging layer to restrict movement of the vacuum bagging layer into first trough 404 during forming. Port 418 is present in first molding surface 408. Port 418 is configured to pull a vacuum in a first cavity formed by first molding surface 408 and a bagging layer. Port 418 provides vacuum to clamp the bagging layer to first tool 400 prior to forming a preform. Port 420 is present in forming surface 410. Port 420 is configured to vent a third vacuum chamber. Port 422 is present in first molding surface 408.

Turning now to FIG. 5, an illustration of a cross-sectional view of a first tool of a molding system is depicted in accordance with an illustrative embodiment. View 500 is a cross-sectional view of first tool 400 of FIG. 4. View 500 is indicated by numeral 5 on FIG. 4. First edge 406 can be more clearly seen in view 500.

Turning now to FIG. 6, an illustration of an isometric view of a second tool of a molding system is depicted in accordance with an illustrative embodiment. Second tool 600 is a physical implementation of second tool 110 of FIG. 1. In some illustrative examples, second tool 600 is used to form composite structure 200 of FIG. 2. In some illustrative examples, second tool 600 may be the same as second tool 304 of FIG. 3.

Second tool 600 comprises second vacuum groove 602, second trough 604 having second edge 606 configured to form a second bend of the composite structure, and second molding surface 608.

Forming surface 610 includes second trough 604 and second molding surface 608 configured to form features into a composite structure.

Second tool 600 has plurality of ports 612 configured to be connected to a vacuum source. Plurality of ports 612 includes port 614, port 616, and port 618.

Port 614 is present in second trough 604. Port 614 is configured to evacuate a second vacuum chamber formed by second trough 604 to form a preform to second edge 606. Port 616 is present in second vacuum groove 602. Port 616 is configured to seal a second bagging layer to second tool 600. Port 618 is present in second molding surface 608. Port 618 is configured to seal a second bagging layer to second tool 600 at second molding surface 608.

Turning now to FIG. 7, an illustration of a cross-sectional view of a second tool of a molding system is depicted in accordance with an illustrative embodiment. View 700 is a cross-sectional view of second tool 600 of FIG. 6. View 700 is indicated by numeral 7 on FIG. 6. Second edge 606 can be more clearly seen in view 700.

FIGS. 8-17 depict a series of views for forming a composite structure using a molding system. Some components are depicted as transparent in FIGS. 8-17 for ease of illustration. The depiction of components in FIGS. 8-17 does not limit the implementations of the illustrative examples. Beginning at FIG. 8, an illustration of a top view of a first tool of a molding system with sealing material is depicted in accordance with an illustrative embodiment.

First tool 800 comprises first vacuum groove 802, first trough 804 having first edge 806 configured to form a first bend of a composite structure, and first molding surface 808. Forming surface 810 includes first trough 804 and first molding surface 808 configured to form features into a composite structure.

First tool 800 is a physical implementation of first tool 108 of FIG. 1. In some illustrative examples, first tool 800 is used to form composite structure 200 of FIG. 2. In some illustrative examples, first tool 800 may be the same as first tool 302 of FIG. 3. In some illustrative examples, first tool 800 may be the same as first tool 400 of FIG. 4.

In view 811, adhesive transfer tape 812 is present on either side of breather 814. Adhesive transfer tape 812 is a sealing material. Breather 814 is positioned over first molding surface 808 and port 816 in first molding surface 808. Breather 814 will distribute vacuum from port 816 across first molding surface 808 between adhesive transfer tape 812.

Figure 9:
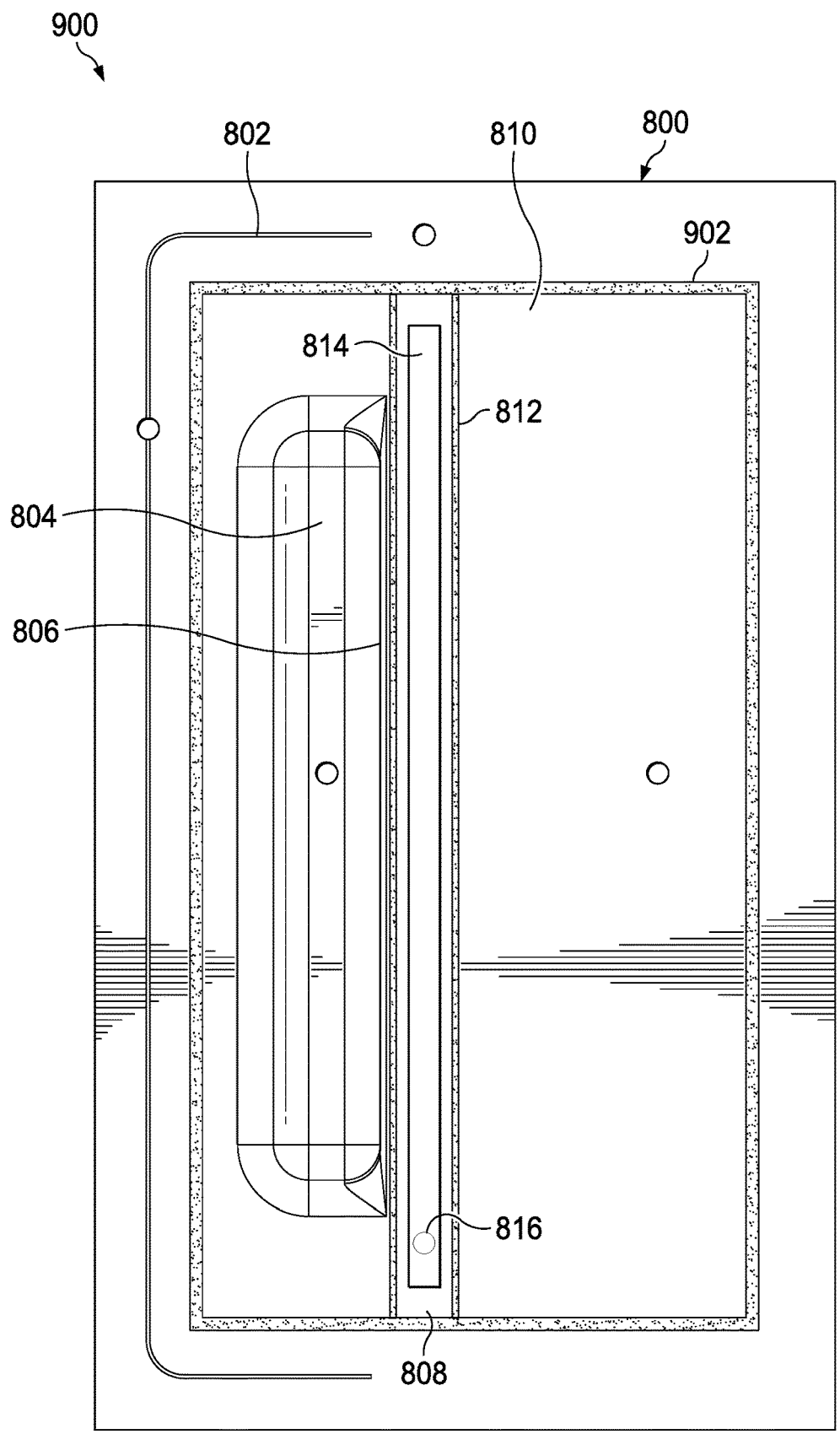
FIG. 9 is an illustration of a top view of sealing material surrounding a trough and a first molding surface of a first tool of a molding system in accordance with an illustrative embodiment.

Turning now to FIG. 9, an illustration of a top view of sealing material surrounding a trough and a first molding surface of a first tool of a molding system is depicted in accordance with an illustrative embodiment. In view 900, sealing material 902 has been positioned on forming surface 810 around first molding surface 808 and trough 804 such that sealing material 902 is in contact with adhesive transfer tape 812.

Figure 10:
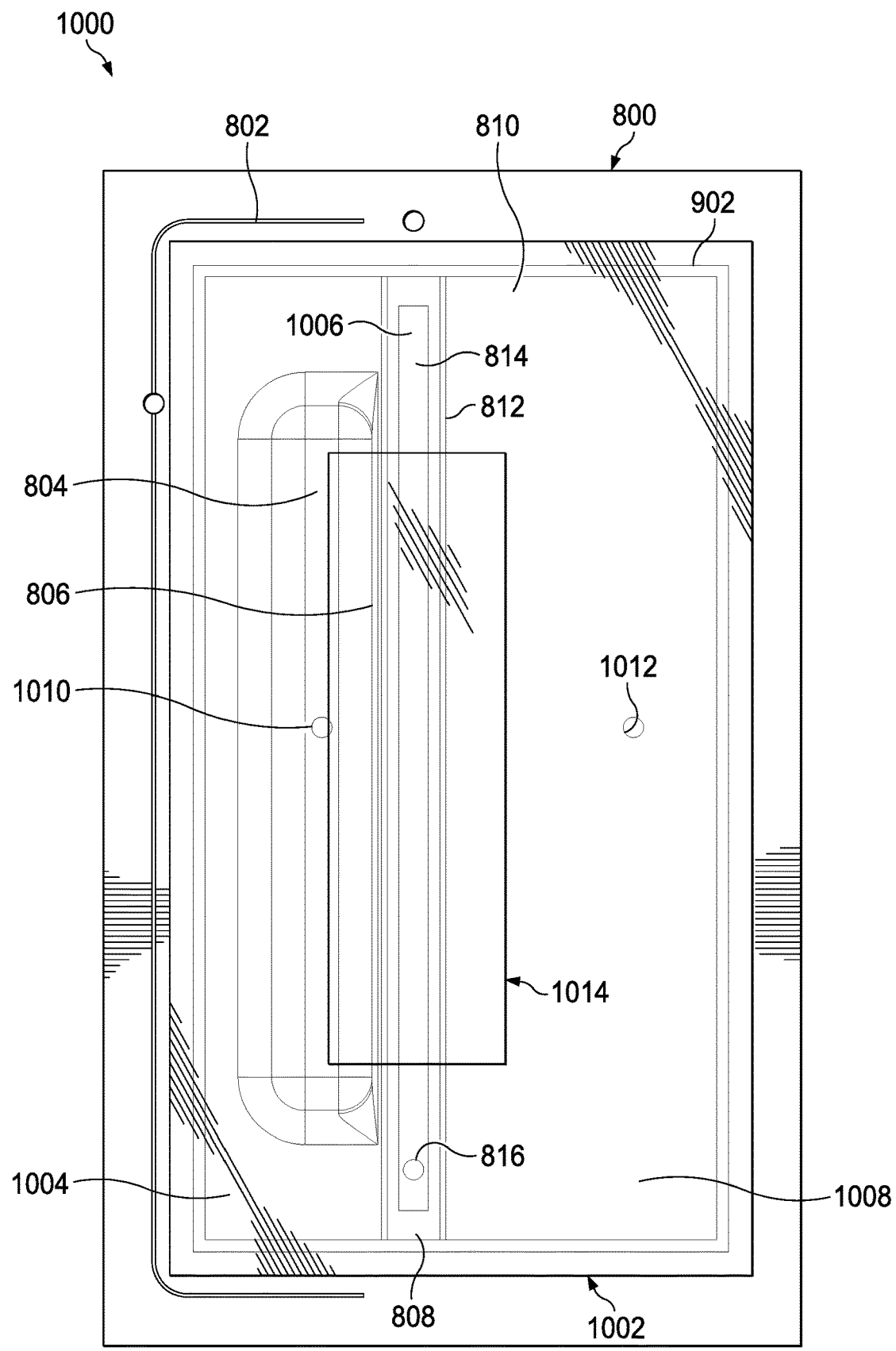
FIG. 10 is an illustration of a top view of a first bagging layer sealed to a first tool of a molding system in accordance with an illustrative embodiment.

Turning now to FIG. 10, an illustration of a top view of a first bagging layer sealed to a first tool of a molding system is depicted in accordance with an illustrative embodiment. In view 1000, first bagging layer 1002 has been placed over first trough 804 and first molding surface 808. First bagging layer 1002 is sealed to first tool 800 by sealing material 902.

Sealing first bagging layer 1002 to first tool 800 forms first vacuum chamber 1004, first cavity 1006, and third vacuum chamber 1008. Prior to shaping a preform, first cavity 1006 is at least partially evacuated to clamp first bagging layer 1002 to first molding surface 808. First vacuum chamber 1004 will be at least partially evacuated to shape a preform. First vacuum chamber 1004 is at least partially evacuated by applying a vacuum using port 1010 in first trough 804. During shaping of the preform, pressure in third vacuum chamber 1008 is controlled to allow for shaping of the preform. Pressure in third vacuum chamber 1008 is controlled using port 1012. In some illustrative examples, third vacuum chamber 1008 is vented to the atmosphere.

In view 1000, layer 1014 is placed on first bagging layer 1002. A preform will be placed over layer 1014 in subsequent steps. Layer 1014 provides any desirable processing characteristics. In some illustrative examples, layer 1014 is at least one of a breather or a release film.

Figure 11:
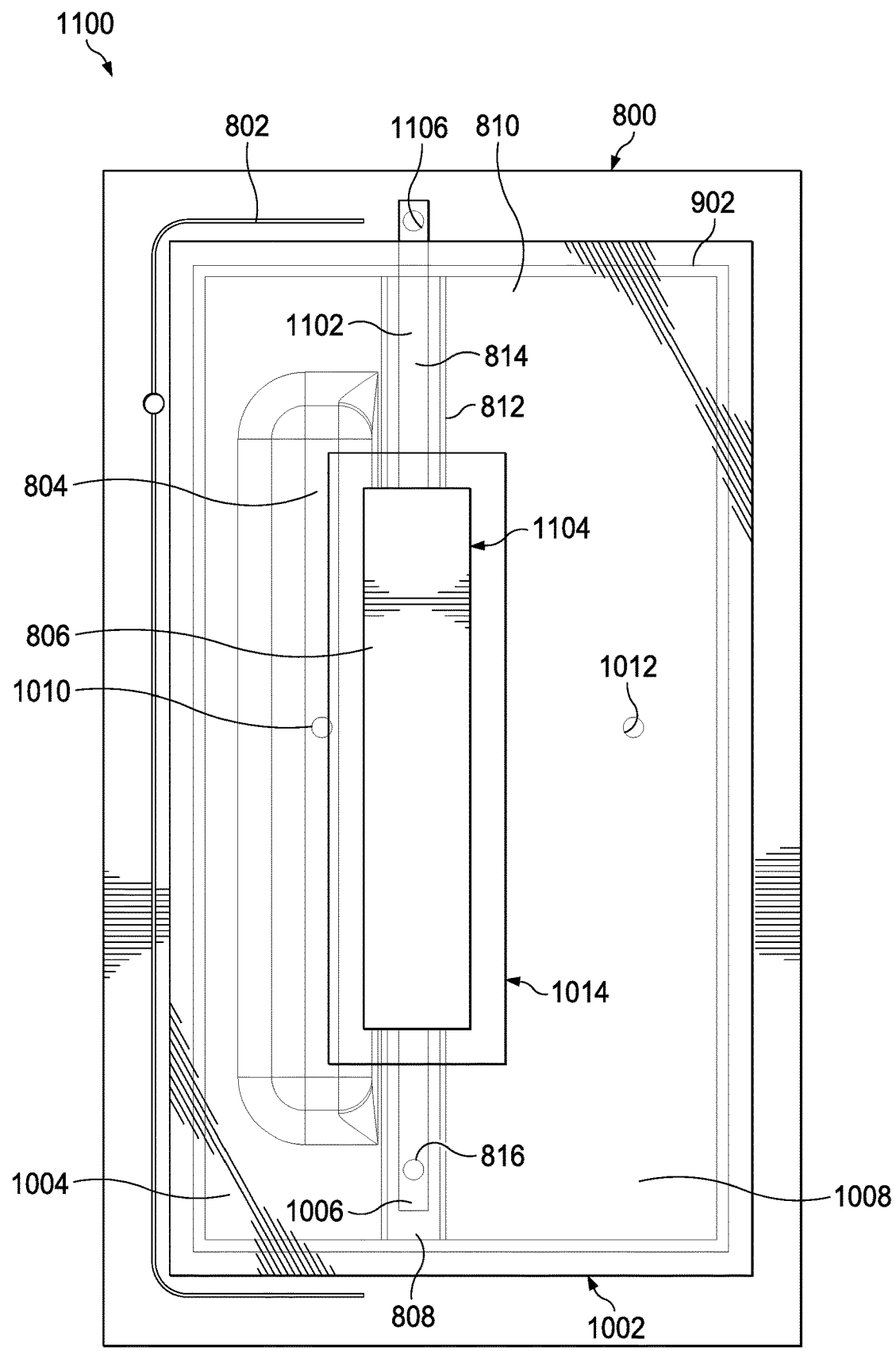
FIG. 11 is an illustration of a top view of a preform placed over a first bagging layer and a first tool of a molding system in accordance with an illustrative embodiment.

Turning now to FIG. 11, an illustration of a top view of a preform placed over a first bagging layer and a first tool of a molding system is depicted in accordance with an illustrative embodiment. In view 1100, breather 1102 is placed over first bagging layer 1002 and preform 1104 is placed over breather 1102.

Breather 1102 is positioned over port 1106 of first tool 800. First port 1106 provides vacuum to a compaction region containing preform 1104. Vacuum provided to first port 1106 is distributed beneath preform 1104 by breather 1102.

Figure 12:
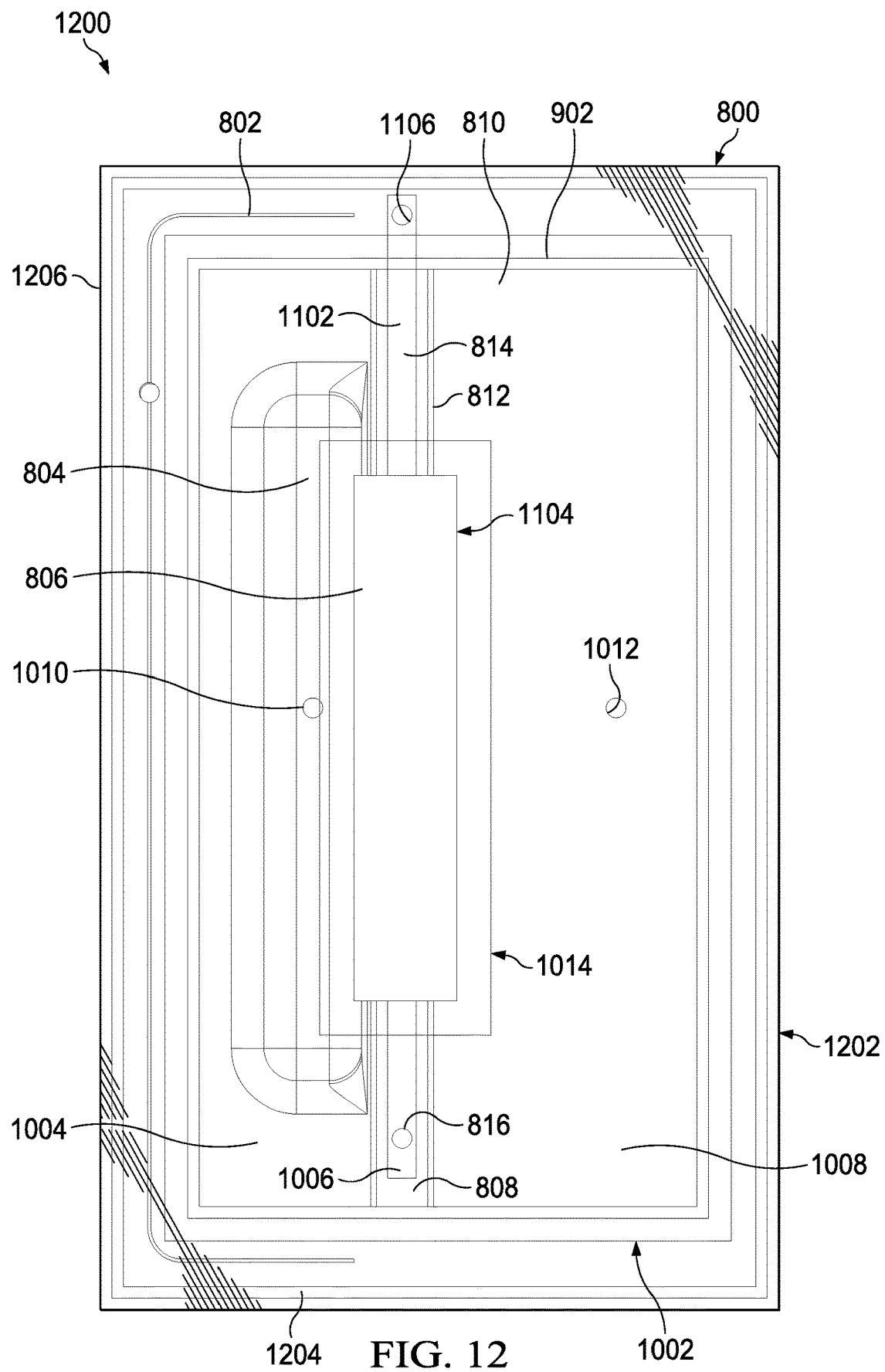
FIG. 12 is an illustration of a top view of a second bagging layer sealed over a first bagging layer and to a first tool of a molding system in accordance with an illustrative embodiment.

Turning now to FIG. 12, an illustration of a top view of a second bagging layer sealed over a first bagging layer and to a first tool of a molding system is depicted in accordance with an illustrative embodiment. In view 1200, second bagging layer 1202 has been sealed to first tool 800 by sealing material 1204. Sealing material 1204 follows periphery 1206 of first tool 800. Sealing material 1204 extends around first vacuum groove 802, breather 1102, and first bagging layer 1002.

Figure 13:
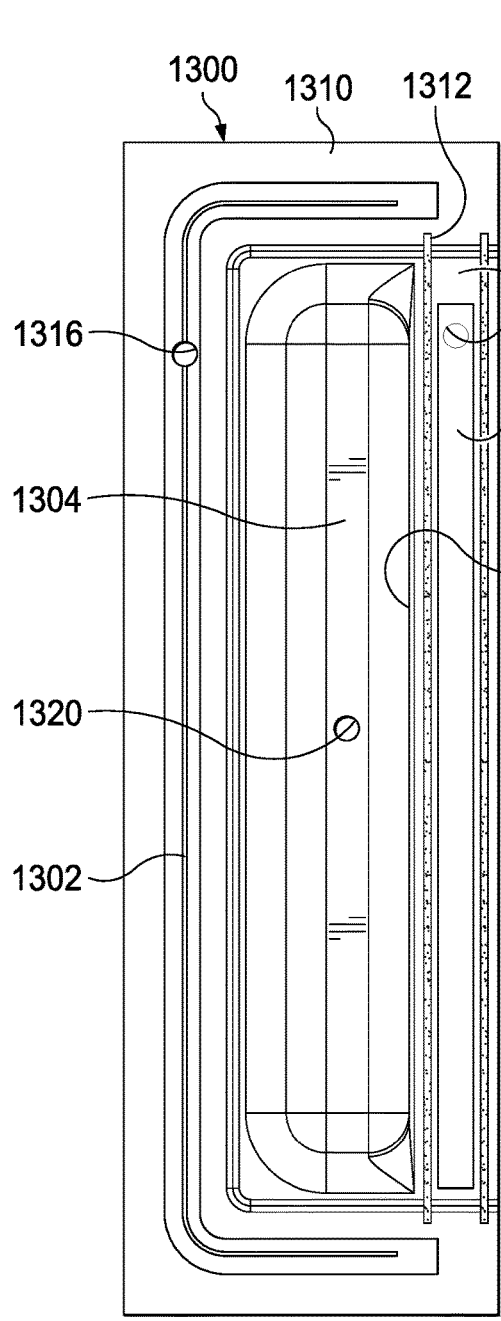
FIG. 13 is an illustration of a top view of material placed onto a second molding surface of a second tool of a molding system in accordance with an illustrative embodiment.

Turning now to FIG. 13, an illustration of a top view of material placed onto a second molding surface of a second tool of a molding system is depicted in accordance with an illustrative embodiment. Second tool 1300 comprises second vacuum groove 1302, second trough 1304 having second edge 1306 configured to form a second bend of the composite structure, and second molding surface 1308. Second tool 1300 is a physical implementation of second tool 110 of FIG. 1. In some illustrative examples, second tool 1300 is used to form composite structure 200 of FIG. 2. In some illustrative examples, second tool 1300 may be the same as second tool 304 of FIG. 3. In some illustrative examples, second tool 1300 may be the same as second tool 600 of FIG. 6.

Forming surface 1310 includes second trough 1304 and second molding surface 1308 configured to form features into a composite structure.

Adhesive transfer tape 1312 is placed on either side of breather 1314. Adhesive transfer tape 1312 is a sealing material. Breather 1314 is positioned over second molding surface 1308 and port 1316 in second molding surface 1308.

Second tool 1300 has port 1316, port 1318, and port 1320. Port 1316 is positioned in second vacuum groove 1302. Port 1318 is positioned in second molding surface 1308. Port 1320 is positioned in second trough 1304.

Port 1316 and port 1318 are used to apply vacuum to pull a vacuum bagging layer against second tool 1300. Port 1320 applies a vacuum to pull a preform against second edge 1306.

Figure 14:
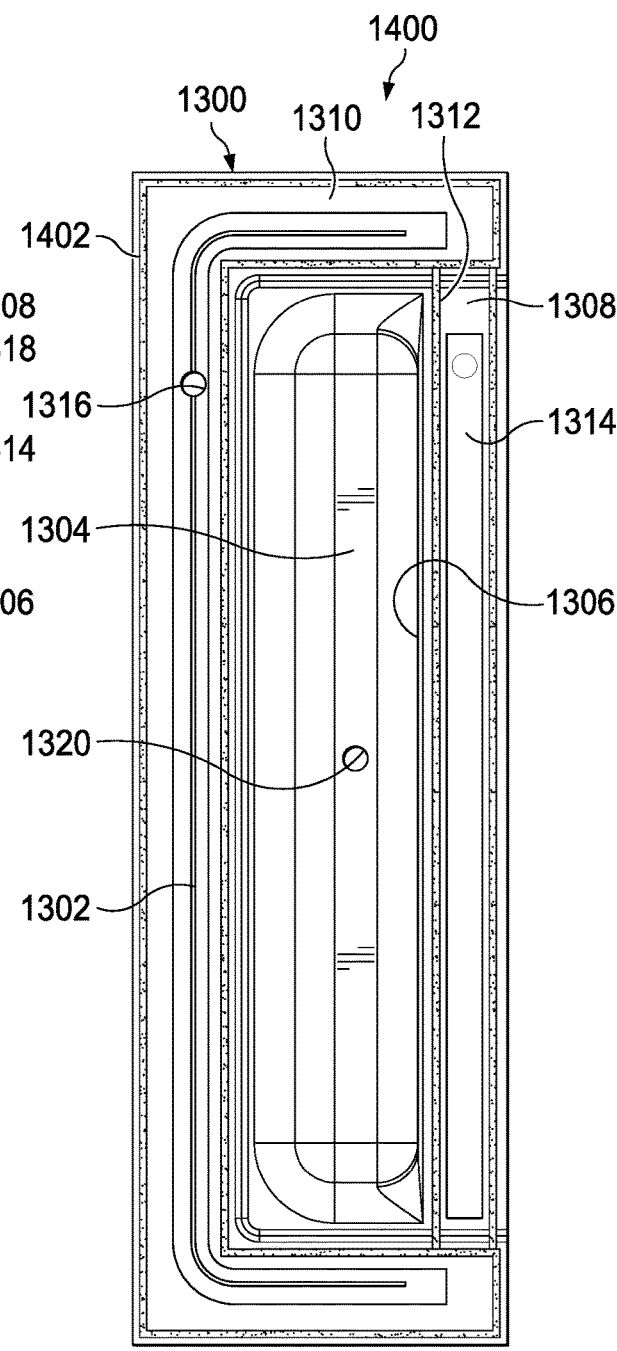
FIG. 14 is an illustration of a top view of sealing material placed around a second vacuum groove of a second tool of a molding system in accordance with an illustrative embodiment.

Turning now to FIG. 14, an illustration of a top view of sealing material placed around a second vacuum groove of a second tool of a molding system is depicted in accordance with an illustrative embodiment. In view 1400, sealing material 1402 is placed around second vacuum groove 1302. Sealing material 1402 is in contact with adhesive transfer tape 1312. Sealing material 1402 takes any desirable form. In some illustrative examples, sealing material 1402 takes the form of mastic.

Figure 15:
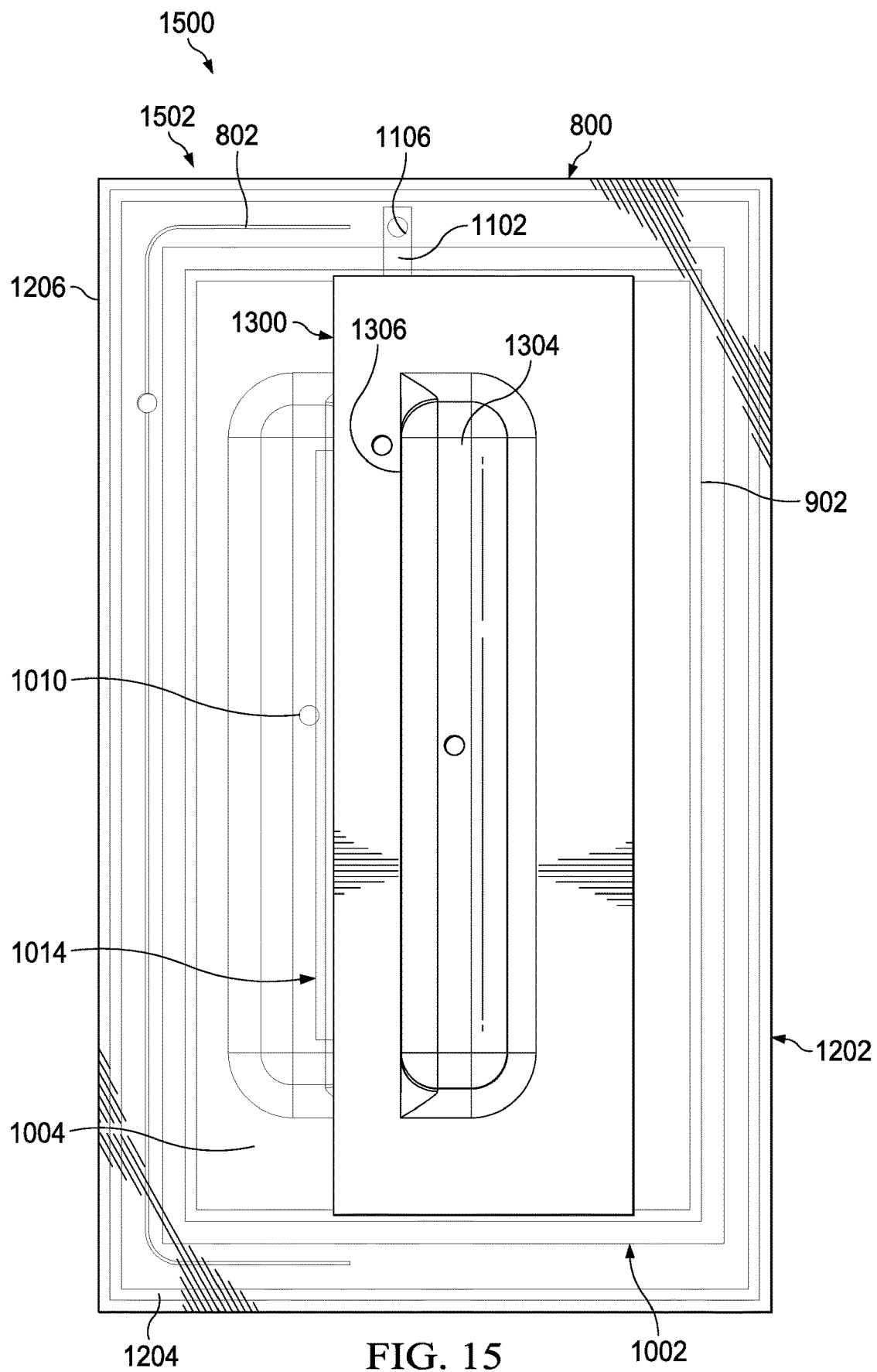
FIG. 15 is an illustration of a top view of a molding system with a second tool sealed to a second bagging layer over a first tool in accordance with an illustrative embodiment.

Turning now to FIG. 15, an illustration of a top view of a molding system with a second tool sealed to a second bagging layer over a first tool is depicted in accordance with an illustrative embodiment. In view 1500, second tool 1300 has been sealed to second bagging layer 1202. Sealing material 1402 and adhesive transfer tape 1312 seal second tool 1300 to second bagging layer 1202. In view 1500, second tool 1300 sealed to second bagging layer 1202 forms molding system 1502.

Figure 16:
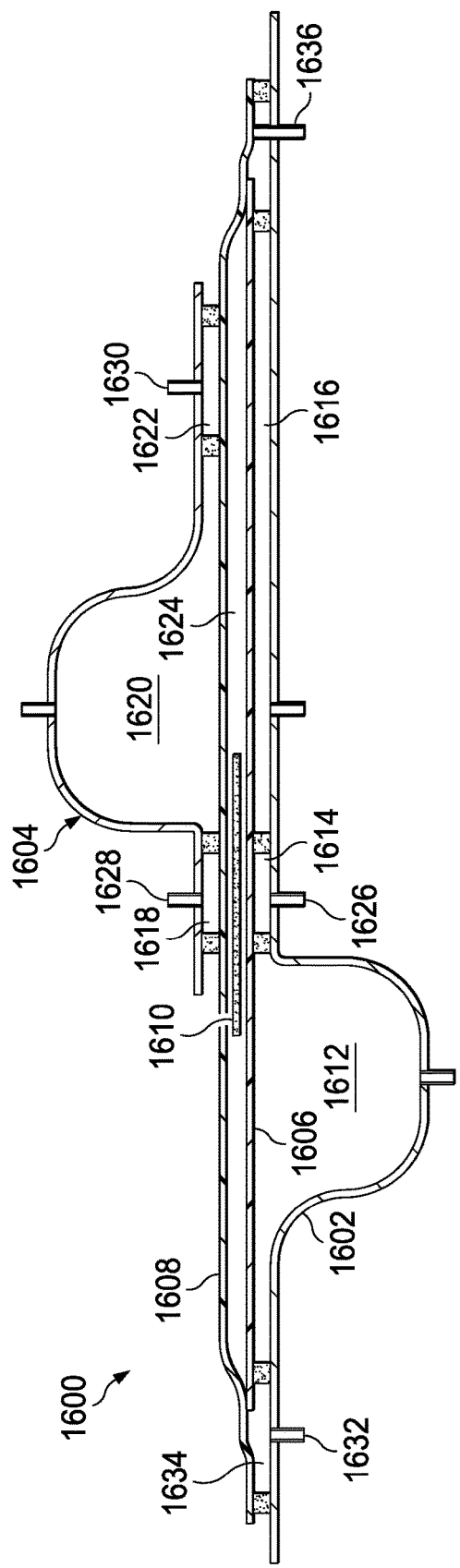
FIG. 16 is an illustration of a cross-sectional view of a preform between a first bagging layer and a second bagging layer, both sealed to a first tool of a molding system and a second tool sealed to the second bagging layer in accordance with an illustrative embodiment.

Turning now to FIG. 16, an illustration of a cross-sectional view of a preform between a first bagging layer and a second bagging layer, both sealed to a first tool of a molding system and a second tool sealed to the second bagging layer is depicted in accordance with an illustrative embodiment. Molding system 1600 is a physical implementation of molding system 102 of FIG. 1. Molding system 1600 can be used to form composite structure 200 of FIG. 2. In some illustrative examples, molding system 1600 is the same as molding system 300 of FIG. 3. In some illustrative examples, molding system 1600 is the same as molding system 1502 of FIG. 15.

Molding system 1600 comprises first tool 1602, second tool 1604, first bagging layer 1606, and second bagging layer 1608. Preform 1610 is positioned between first bagging layer 1606 and second bagging layer 1608. First bagging layer 1606 and second bagging layer 1608 are sealed to first tool 1602. Second tool 1604 is sealed to second bagging layer 1608.

Several cavities are present in molding system 1600. First bagging layer 1606 and first tool 1602 form first vacuum chamber 1612, first cavity 1614, and third vacuum chamber 1616. Second bagging layer 1608 and second tool 1604 form second cavity 1618, second vacuum chamber 1620, and second vacuum groove space 1622. Compaction region 1624 is present between first bagging layer 1606 and second bagging layer 1608. Preform 1610 is present within compaction region 1624.

Prior to forming preform 1610, vacuum is applied to cavities in molding system 1600. Prior to forming preform 1610, vacuum is applied through port 1626 and port 1628 to first cavity 1614 and second cavity 1618. Applying vacuum to first cavity 1614 holds first bagging layer 1606 against first tool 1602. Applying vacuum to second cavity 1618 holds second bagging layer 1608 against second tool 1604.

Prior to forming preform 1610, vacuum is applied through port 1630 to second vacuum groove space 1622. Applying vacuum through port 1630 restrains second bagging layer 1608 from being pulled into second vacuum chamber 1620. Prior to forming preform 1610, vacuum is applied through port 1632. When a sealing material is present, the area receiving the vacuum through port 1632 is referred to as first vacuum groove space 1634. Applying vacuum through port 1632 restrains second bagging layer 1608 from being pulled into first vacuum chamber 1612.

Compaction region 1624 is at least partially evacuated. By at least partially evacuating compaction region 1624, first tool 1602 and second tool 1604 are clamped together. By at least partially evacuating compaction region 1624, a portion of preform 1610 is compacted. To at least partially evacuate compaction region 1624, a vacuum is applied to port 1636.

Figure 17:
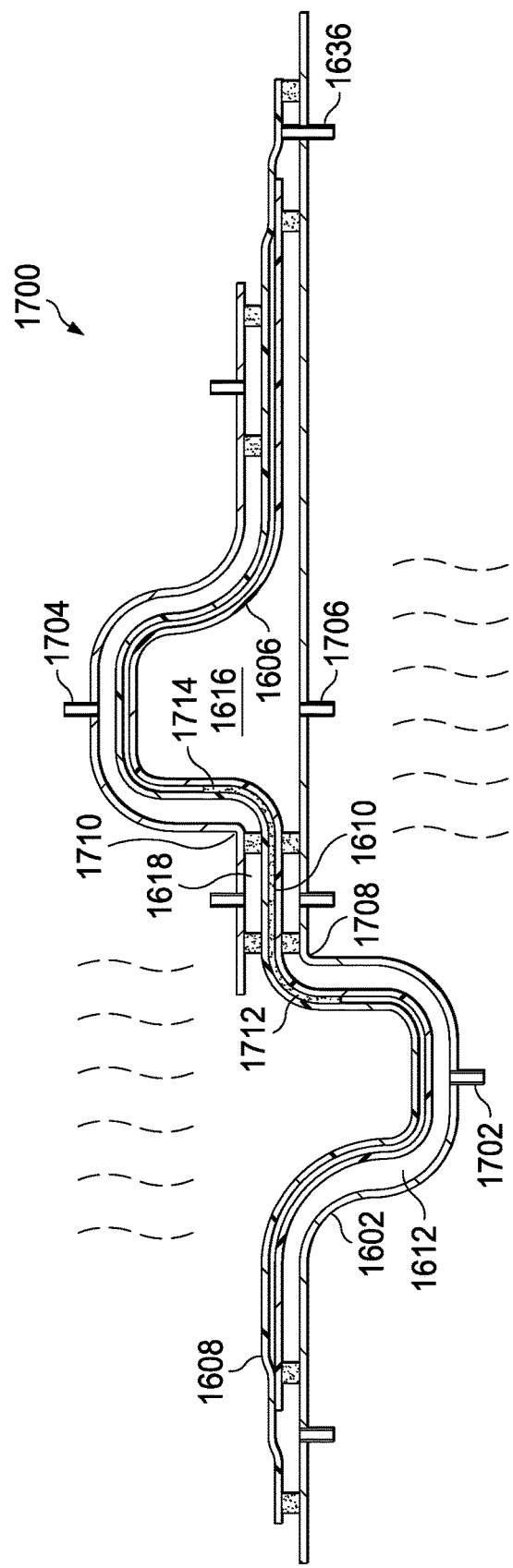
FIG. 17 is an illustration of a cross-sectional view of a preform formed to a first edge of a first trough of a first tool and a second edge of a second trough of a second tool in accordance with an illustrative embodiment.

Turning now to FIG. 17, an illustration of a cross-sectional view of a preform formed to a first edge of a first trough of a first tool and a second edge of a second trough of a second tool is depicted in accordance with an illustrative embodiment. In view 1700, vacuum is applied to first vacuum chamber 1612 and second vacuum chamber 1620 to form preform 1610 against first tool 1602 and second tool 1604.

In view 1700, vacuum has been applied to first vacuum chamber 1612 through port 1702. Vacuum has been applied to second vacuum chamber 1620 through port 1704. During forming of preform 1610, port 1706 is vented to the atmosphere. Port 1706 is vented to the atmosphere to control pressure within third vacuum chamber 1616.

When vacuum is applied to first vacuum chamber 1612 and second vacuum chamber 1620, preform 1610 is formed to first edge 1708 and second edge 1710. In view 1700, preform 1610 has Z-shaped 1712 cross-section 1714.

In some illustrative examples, molding system 1600 is a schematic functional representation. For example, location of port 1636 in molding system 1600 can be in another location other than the location depicted in FIGS. 16 and 17. The location of port 1636 in FIG. 16 is presented for clarity in a cross-sectional view.

The different components shown in FIGS. 2-17 may be combined with components in FIG. 1, used with components in FIG. 1, or a combination of the two. Additionally, some of the components in FIGS. 2-17 may be illustrative examples of how components shown in block form in FIG. 1 can be implemented as physical structures.

The illustration of forming preform 1104 in FIGS. 8-17 is not meant to imply physical or architectural limitations to the manner in which an illustrative embodiment may be implemented. Other components in addition to or in place of the ones illustrated may be used. Some components may be unnecessary. For example, although sealing of second bagging layer 1202 and first bagging layer 1002 is described as using sealant, in other illustrative examples, second bagging layer 1202 and first bagging layer 1002 are sealed using a rubber seal or another desirable sealant alternative.

Figure 18:
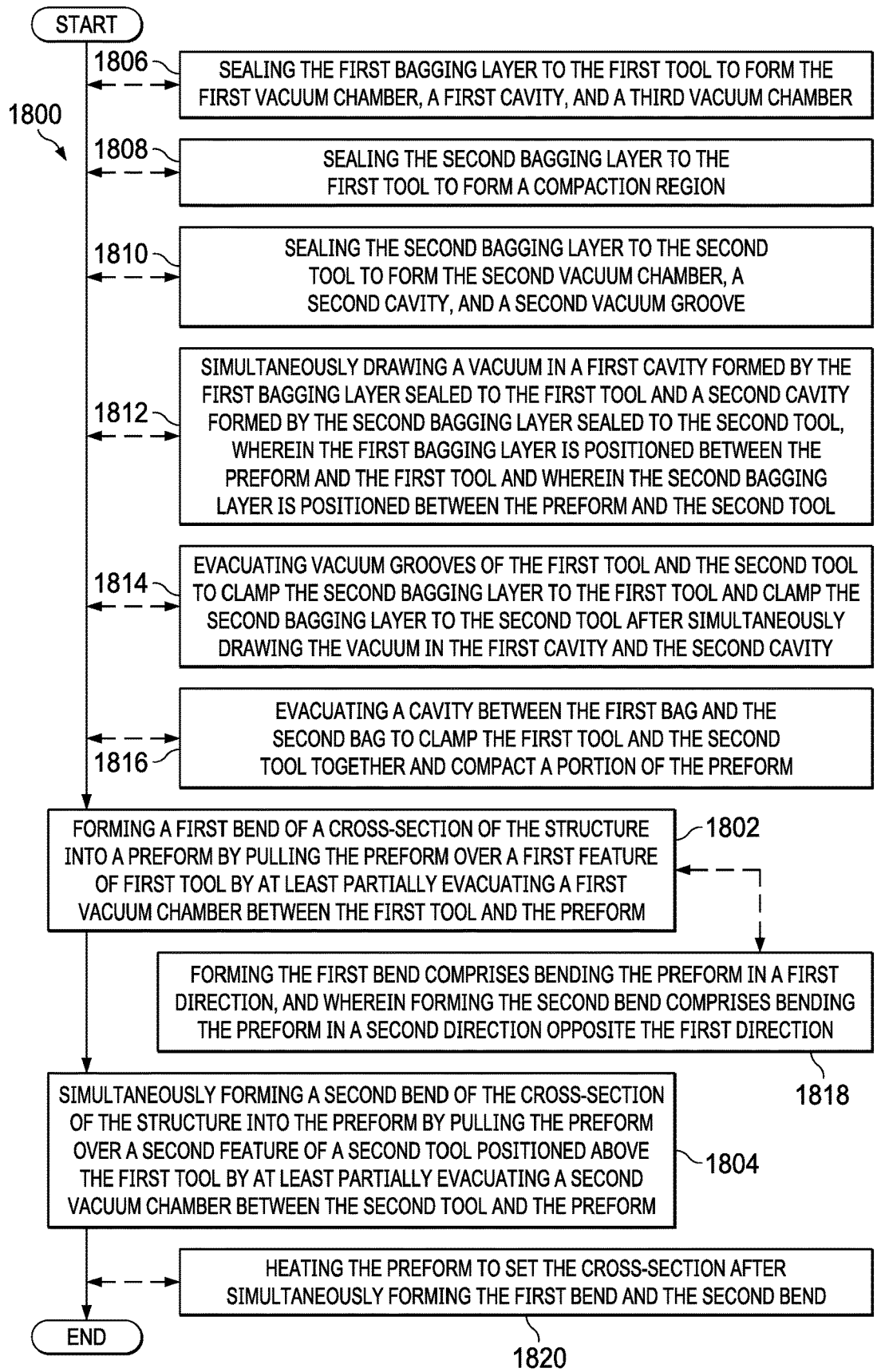
FIG. 18 is an illustration of a flowchart of a method of forming a structure in accordance with an illustrative embodiment.

Turning now to FIG. 18, an illustration of a flowchart of a method of forming a composite structure is depicted in accordance with an illustrative embodiment. Method 1800 may be a method of forming composite structure 107 of FIG. 1. Method 1800 may be used to form composite structure 200 of FIG. 2. Method 1800 may be performed using molding system 300 of FIG. 3. Method 1800 may be performed using first tool 400 of FIGS. 4-5. Method 1800 may be performed using second tool 600 of FIGS. 6-7. FIGS. 8-17 may be physical depictions of a molding system as method 1800 is performed.

Method 1800 forms a first bend of a cross-section of the structure into a preform by pulling the preform over a first feature of a first tool by at least partially evacuating a first vacuum chamber between the first tool and the preform (operation 1802). Method 1800 simultaneously forms a second bend of the cross-section of the structure into the preform by pulling the preform over a second feature of a second tool positioned above the first tool by at least partially evacuating a second vacuum chamber between the second tool and the preform (operation 1804). Afterwards, method 1800 terminates.

In some illustrative examples, the cross-section is a Z-shaped cross-section, wherein forming the first bend comprises bending the preform in a first direction, and wherein forming the second bend comprises bending the preform in a second direction opposite the first direction (operation 1818).

In some illustrative examples, the first vacuum chamber between the first tool and the preform is a chamber formed by a first bagging layer and the first tool, wherein the second vacuum chamber between the second tool and the preform is a chamber formed by a second bagging layer and the second tool. In some illustrative examples, method 1800 simultaneously draws a vacuum in a first cavity formed by the first bagging layer sealed to the first tool and a second cavity formed by the second bagging layer sealed to the second tool, wherein the first bagging layer is positioned between the preform and the first tool and wherein the second bagging layer is positioned between the preform and the second tool (operation 1812). In some illustrative examples, method 1800 evacuates vacuum grooves of the first tool and the second tool to clamp the second bagging layer to the first tool and clamp the second bagging layer to the second tool after simultaneously drawing the vacuum in the first cavity and the second cavity (operation 1814).

In some illustrative examples, method 1800 evacuates a cavity between the first bagging layer and the second bagging layer to clamp the first tool and the second tool together and compact a portion of the preform (operation 1816).

In some illustrative examples, method 1800 seals the first bagging layer to the first tool to form the first vacuum chamber, a first cavity, and a third vacuum chamber (operation 1806). In some illustrative examples, method 1800 seals the second bagging layer to the first tool to form a compaction region (operation 1808). In some illustrative examples, method 1800 seals the second bagging layer to the second tool to form the second vacuum chamber, a second cavity, and a second vacuum groove space (operation 1810).

In some illustrative examples, the preform is a prepreg material, and method 1800 comprises heating the preform to set the cross-section after simultaneously forming the first bend and the second bend (operation 1820).

Figure 19:
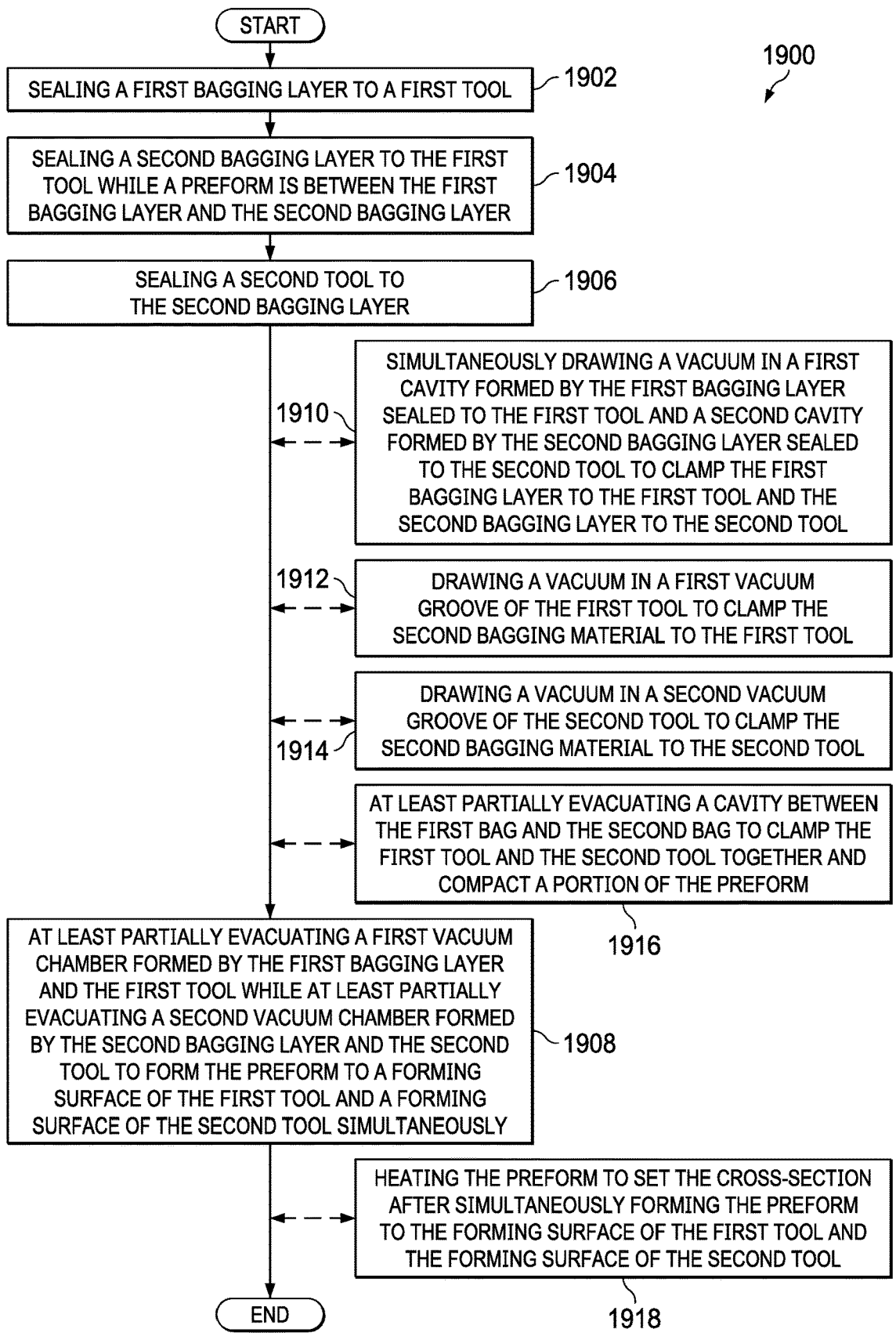
FIG. 19 is an illustration of a flowchart of a method of forming a structure in accordance with an illustrative embodiment.

Turning now to FIG. 19, an illustration of a flowchart of a method of forming a structure is depicted in accordance with an illustrative embodiment. Method 1900 may be a method of forming composite structure 107 of FIG. 1. Method 1900 may be used to form composite structure 200 of FIG. 2. Method 1900 may be performed using molding system 300 of FIG. 3. Method 1900 may be performed using first tool 400 of FIGS. 4-5. Method 1900 may be performed using second tool 600 of FIGS. 6-7. FIGS. 8-17 may be physical depictions of a molding system as method 1900 is performed.

Method 1900 seals a first bagging layer to a first tool (operation 1902). Method 1900 seals a second bagging layer to the first tool while a preform is between the first bagging layer and the second bagging layer (operation 1904). Method 1900 seals a second tool to the second bagging layer (operation 1906). Method 1900 at least partially evacuates a first vacuum chamber formed by the first bagging layer and the first tool while at least partially evacuating a second vacuum chamber formed by the second bagging layer and the second tool to form the preform to a forming surface of the first tool and a forming surface of the second tool simultaneously (operation 1908). Afterwards method 1900 terminates.

In some illustrative examples, method 1900 simultaneously draws a vacuum in a first cavity formed by the first bagging layer sealed to the first tool and a second cavity formed by the second bagging layer sealed to the second tool to clamp the first bagging layer to the first tool and the second bagging layer to the second tool (operation 1910). As depicted, simultaneously drawing a vacuum in the first cavity and the second cavity is performed prior to at least partially evacuating the first vacuum chamber and the second vacuum chamber. By clamping the first bagging layer to the first tool and the second bagging layer to the second tool, the bagging layers are restricted from being pulled into the first trough of the first tool and the second trough of the second tool.

In some illustrative examples, method 1900 draws a vacuum in a first vacuum groove of the first tool to clamp the second bagging layer to the first tool (operation 1912). In some illustrative examples, method 1900 draws a vacuum in a second vacuum groove of the second tool to clamp the second bagging layer to the second tool (operation 1914). Clamping the second bagging layer to the second tool restricts movement of the second bagging layer into the second trough of the second tool.

In some illustrative examples, method 1900 at least partially evacuates a cavity between the first bagging layer and the second bagging layer to clamp the first tool and the second tool together and compact a portion of the preform (operation 1916). In some illustrative examples, compacting the portion of the preform forms a web of a composite structure with a Z-shaped cross-section.

In some illustrative examples, the preform is a prepreg material, and method 1900 heats the preform to set the cross-section after simultaneously forming the preform to the forming surface of the first tool and the forming surface of the second tool (operation 1918). In some illustrative examples, the molding system is placed in an oven or an autoclave to heat the preform.

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, "at least one of item A, item B, or item C" may include, without limitation, item A, item A and item B, or item B. This example also may include item A, item B, and item C, or item B and item C. Of course, any combination of these items may be present. In other examples, "at least one of" may be, for example, without limitation, two of item A, one of item B, and ten of item C; four of item B and seven of item C; or other suitable combinations.

The flowcharts and block diagrams in the different depicted embodiments illustrate the architecture, functionality, and operation of some possible implementations of apparatus and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added, in addition to the illustrated blocks, in a flowchart or block diagram. Some blocks may be optional. For example, operation 1806 through operation 1820 of FIG. 18 may be optional. As another example, operation 1910 through operation 1918 of FIG. 19 may be optional.

Figure 20:
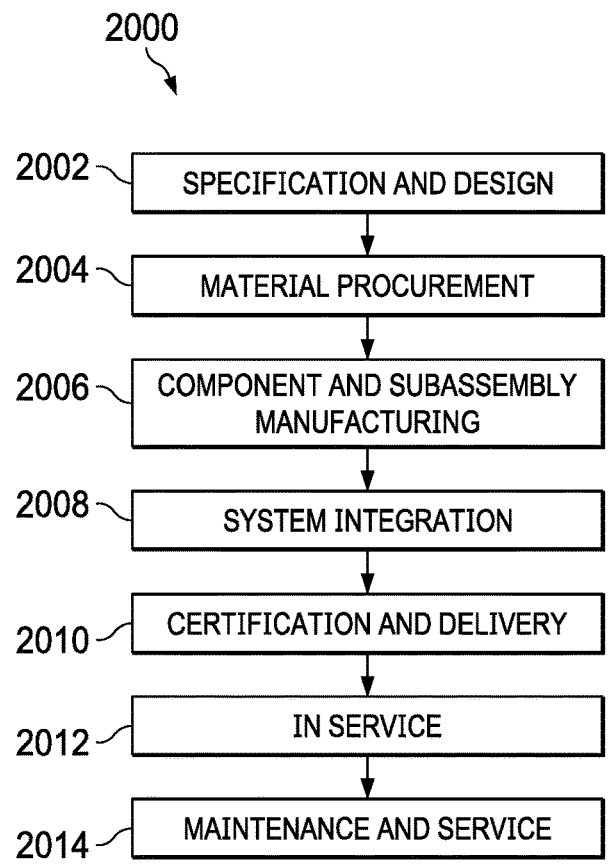
FIG. 20 is an illustration of a block diagram of an aircraft manufacturing and service method in accordance with an illustrative embodiment.
Figure 21:
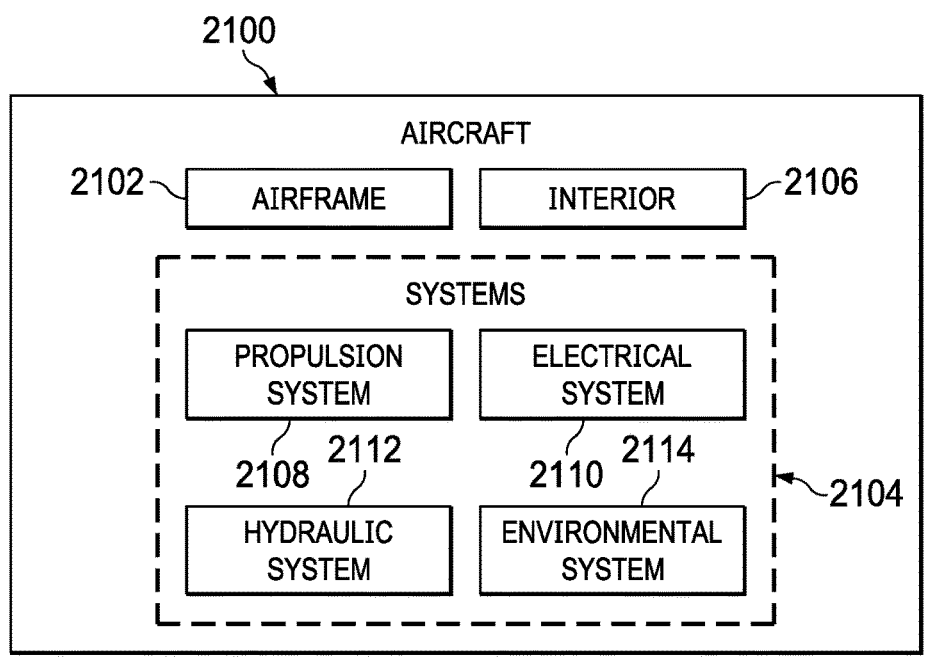
FIG. 21 is an illustration of a block diagram of an aircraft in which an illustrative embodiment may be implemented.

Illustrative embodiments of the present disclosure may be described in the context of aircraft manufacturing and service method 2000 as shown in FIG. 20 and aircraft 2100 as shown in FIG. 21. Turning first to FIG. 20, an illustration of an aircraft manufacturing and service method is depicted in accordance with an illustrative embodiment. During pre-production, aircraft manufacturing and service method 2000 may include specification and design 2002 of aircraft 2100 in FIG. 21 and material procurement 2004.

During production, component and subassembly manufacturing 2006 and system integration 2008 of aircraft 2100 takes place. Thereafter, aircraft 2100 may go through certification and delivery 2010 in order to be placed in service 2012. While in service 2012 by a customer, aircraft 2100 is scheduled for routine maintenance and service 2014, which may include modification, reconfiguration, refurbishment, or other maintenance and service.

Each of the processes of aircraft manufacturing and service method 2000 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 21, an illustration of an aircraft is depicted in which an illustrative embodiment may be implemented. In this example, aircraft 2100 is produced by aircraft manufacturing and service method 2000 of FIG. 20 and may include airframe 2102 with plurality of systems 2104 and interior 2106. Examples of systems 2104 include one or more of propulsion system 2108, electrical system 2110, hydraulic system 2112, and environmental system 2114. Any number of other systems may be included.

Apparatuses and methods embodied herein may be employed during at least one of the stages of aircraft manufacturing and service method 2000. One or more illustrative embodiments may be used during at least one of component and subassembly manufacturing 2006, system integration 2008, or maintenance and service 2014 of FIG. 20. For example, the illustrative examples could be used during component and subassembly manufacturing 2006 to assemble a composite stiffener, such as composite structure 107. For example, method 1800 may be used during component and subassembly manufacturing 2006 to form Z-shaped 172 cross-section 174 in composite structure 107. Method 1800 may be used to manufacture a portion of airframe 2102 of aircraft 2100. As another example, method 1900 may be used during component and subassembly manufacturing 2006 to form Z-shaped 172 cross-section 174 in composite structure 107. Method 1900 may be used to manufacture a portion of airframe 2102 of aircraft 2100.

The illustrative examples provide a cost-effective means of fabricating complex shapes into composite structures. In one illustrative example, a Z-shaped cross-section is produced in a stiffener. The illustrative examples provide reduced labor costs. The illustrative examples enable higher deposition rates through flat layup, which could be potentially automated. The illustrative examples enable increased production rates for composite structure with complex cross-sections.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of forming a structure, the method comprising:
    forming a first bend of a cross-section of the structure into a preform by pulling the preform over a first feature of a first tool by at least partially evacuating a first vacuum chamber between the first tool and the preform, the first vacuum chamber formed by a first bagging layer and the first tool;
    simultaneously forming a second bend of the cross-section of the structure into the preform by pulling the preform over a second feature of a second tool positioned above the first tool by at least partially evacuating a second vacuum chamber between the second tool and the preform, the second vacuum chamber formed by a second bagging layer and the second tool; and
    prior to forming the first bend and the second bend, simultaneously drawing a vacuum in a first cavity formed by the first bagging layer sealed to the first tool to hold the first bagging layer to the first tool and in a second cavity formed by the second bagging layer sealed to the second tool to hold the second bagging layer to the second tool, wherein the first bagging layer is positioned between the preform and the first tool, wherein the second bagging layer is positioned between the preform and the second tool, and wherein the first cavity is sealed from the first vacuum chamber and the second cavity is sealed from the second vacuum chamber.

2. The method of claim 1, wherein the cross-section is a Z-shaped cross-section, wherein forming the first bend comprises bending the preform in a first direction, and wherein forming the second bend comprises bending the preform in a second direction opposite the first direction.

3. The method of claim 1 further comprising:
    evacuating vacuum grooves of the first tool and the second tool to clamp the second bagging layer to the first tool and clamp the second bagging layer to the second tool after simultaneously drawing the vacuum in the first cavity and the second cavity.

4. The method of claim 3 further comprising:
    evacuating a cavity between the first bagging layer and the second bagging layer to clamp the first tool and the second tool together and compact a portion of the preform.

5. The method of claim 1 further comprising:
    sealing the first bagging layer to the first tool to form the first vacuum chamber, the first cavity, and a third vacuum chamber, wherein the third vacuum chamber is sealed from the first vacuum chamber and the first cavity;
    sealing the second bagging layer to the first tool to form a compaction region; and
    sealing the second bagging layer to the second tool to form the second vacuum chamber, the second cavity, and a second vacuum groove space.

6. The method of claim 5, wherein during forming of the preform, a port to the third vacuum chamber vents the third vacuum chamber to the atmosphere to control pressure within the third vacuum chamber.

7. The method of claim 1, wherein the preform is a prepreg material, the method further comprising:
    heating the preform to set the cross-section after simultaneously forming the first bend and the second bend.

8. The method of claim 1, wherein:
    the first tool comprises a first vacuum groove and the first feature comprises a first trough having a first edge configured to form the first bend of the structure and a first molding surface; and
    the second tool comprises a second vacuum groove and the second feature comprises a second trough having a second edge configured to form the second bend of the structure, and a second molding surface.

9. The method of claim 8 further comprising:
    sealing the first bagging layer to the first tool between the first vacuum groove and the first trough such that the first bagging layer extends over the first trough; and
    sealing the second bagging layer to the first tool such that the second bagging layer extends over the first vacuum groove and the first trough.

10. The method of claim 9 wherein the second tool is sealed to the second bagging layer over the first molding surface of the first tool.

11. The method of claim 10, wherein sealing the second bagging layer to the second tool comprises sealing the second bagging layer to the second tool such that the second trough faces the first molding surface.

12. A method of forming a cross-section of a structure comprising:
sealing a first bagging layer to a first tool;
sealing a second bagging layer to the first tool while a preform is between the first bagging layer and the second bagging layer;
sealing a second tool to the second bagging layer;
at least partially evacuating a first vacuum chamber formed by the first bagging layer and the first tool while at least partially evacuating a second vacuum chamber formed by the second bagging layer and the second tool to form the preform to a forming surface of the first tool and a forming surface of the second tool simultaneously; and
simultaneously drawing a vacuum in a first cavity formed by the first bagging layer sealed to the first tool and a second cavity formed by the second bagging layer sealed to the second tool to clamp the first bagging layer to the first tool and the second bagging layer to the second tool, wherein simultaneously drawing a vacuum in the first cavity and the second cavity is performed prior to at least partially evacuating the first vacuum chamber and the second vacuum chamber, and wherein the first cavity is sealed from the first vacuum chamber and the second cavity is sealed from the second vacuum chamber.

13. The method of claim 12 further comprising:
drawing a vacuum in a first vacuum groove of the first tool to clamp the second bagging layer to the first tool; and
drawing a vacuum in a second vacuum groove of the second tool to clamp the second bagging layer to the second tool.

14. The method of claim 13 further comprising:
at least partially evacuating a cavity between the first bagging layer and the second bagging layer to clamp the first tool and the second tool together and compact a portion of the preform.

15. The method of claim 13, wherein:
the first tool comprises the first vacuum groove, a first trough having a first edge configured to form a first bend of the structure, and a first molding surface; and
the second tool comprises the second vacuum groove, a second trough having a second edge configured to form a second bend of the structure, and a second molding surface.

16. The method of claim 15, wherein the first vacuum groove has a C-shape that extends around a portion of the first trough.

17. The method of claim 15, wherein the second vacuum groove has a C-shape that extends around a portion of the second trough.

18. The method of claim 12, wherein the preform is a prepreg material, the method further comprising:
heating the preform to set the cross-section after simultaneously forming the preform to the forming surface of the first tool and the forming surface of the second tool.

19. The method of claim 12, wherein simultaneously forming the preform to the forming surface of the first tool and the forming surface of the second tool forms a first bend of a cross-section of the structure by forming the preform over a first feature of the first tool and a second bend of the cross-section of the structure by forming the preform over a second feature of the second tool.

20. The method of claim 19, wherein forming the first bend comprises bending the preform in a first direction, and wherein forming the second bend comprises bending the preform in a second direction opposite the first direction.

* * * * *